(12) United States Patent
Chan

(10) Patent No.: US 7,625,825 B2
(45) Date of Patent: Dec. 1, 2009

(54) METHOD OF PATTERNING MECHANICAL LAYER FOR MEMS STRUCTURES

(75) Inventor: Wen-Sheng Chan, Jhubei (TW)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 250 days.

(21) Appl. No.: 11/763,234

(22) Filed: Jun. 14, 2007

(65) Prior Publication Data

US 2008/0310008 A1 Dec. 18, 2008

(51) Int. Cl.
*H01L 21/302* (2006.01)
*H01L 21/31* (2006.01)

(52) U.S. Cl. ...................... 438/720; 438/754

(58) Field of Classification Search ......... 438/717–720, 438/753–757
See application file for complete search history.

(56) References Cited

U.S. PATENT DOCUMENTS

| | | | |
|---|---|---|---|
| 3,728,030 A | 4/1973 | Hawes | |
| 3,955,880 A | 5/1976 | Lierke | |
| 4,377,324 A | 3/1983 | Durand et al. | |
| 4,482,213 A | 11/1984 | Piliavin et al. | |
| 4,519,676 A | 5/1985 | te Velde | |
| 4,786,128 A | 11/1988 | Birnbach | |
| 4,790,635 A | 12/1988 | Apsley | |
| 4,900,136 A | 2/1990 | Goldburt et al. | |
| 4,965,562 A | 10/1990 | Verhulst | |
| 5,022,745 A | 6/1991 | Zahowski et al. | |
| 5,044,736 A | 9/1991 | Jaskie et al. | |
| 5,075,796 A | 12/1991 | Schildkraut et al. | |
| 5,099,353 A | 3/1992 | Hornbeck | |
| 5,124,834 A | 6/1992 | Cusano et al. | |
| 5,168,406 A | 12/1992 | Nelson | |

(Continued)

FOREIGN PATENT DOCUMENTS

CH 680534 9/1992

(Continued)

OTHER PUBLICATIONS

Chiou et al., "A Novel Capacitance Control Design of Tunable Capacitor Using Multiple Electrostatic Driving Electrodes," IEEE Nano 2001, M 3.1, Nanoelectronics and Giga-Scale Systems (Special Session), Oct. 29, 2001, pp. 319-324.

(Continued)

*Primary Examiner*—Calvin Lee
(74) *Attorney, Agent, or Firm*—Knobbe, Martens, Olson & Bear LLP

(57) ABSTRACT

A method of making a microelectromechanical system (MEMS) device is disclosed. The method includes forming a stationary layer over a substrate. A sacrificial layer is formed over the stationary layer. The sacrificial layer is formed of a first material. A mechanical layer is formed over the sacrificial layer. A hard mask layer is formed over the mechanical layer. The hard mask layer is formed of a second material. The first and second materials are etchable by a single etchant which is substantially selective for etching the first and second materials relative to the mechanical layer. The hard mask layer is patterned after forming the hard mask layer. Subsequently, the mechanical layer is etched through the patterned hard mask layer. The patterned hard mask layer is removed simultaneously with the sacrificial layer after etching the mechanical layer.

45 Claims, 20 Drawing Sheets

U.S. PATENT DOCUMENTS

| | | |
|---|---|---|
| 5,172,262 A | 12/1992 | Hornbeck |
| 5,192,395 A | 3/1993 | Boysel et al. |
| 5,212,582 A | 5/1993 | Nelson |
| 5,226,099 A | 7/1993 | Mignardi et al. |
| 5,231,532 A | 7/1993 | Magel et al. |
| 5,293,272 A | 3/1994 | Jannson et al. |
| 5,311,360 A | 5/1994 | Bloom et al. |
| 5,312,512 A | 5/1994 | Allman et al. |
| 5,345,328 A | 9/1994 | Fritz et al. |
| 5,347,377 A | 9/1994 | Revelli, Jr. et al. |
| 5,381,232 A | 1/1995 | van Wijk |
| 5,489,952 A | 2/1996 | Gove et al. |
| 5,500,761 A | 3/1996 | Goossen et al. |
| 5,535,047 A | 7/1996 | Hornbeck |
| 5,552,924 A | 9/1996 | Tregilgas |
| 5,559,358 A | 9/1996 | Burns et al. |
| 5,578,976 A | 11/1996 | Yao |
| 5,608,468 A | 3/1997 | Gove et al. |
| 5,619,059 A | 4/1997 | Li et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,638,946 A | 6/1997 | Zavracky |
| 5,710,656 A | 1/1998 | Goossen |
| 5,739,945 A | 4/1998 | Tayebati |
| 5,745,281 A | 4/1998 | Yi et al. |
| 5,771,321 A | 6/1998 | Stern |
| 5,784,189 A | 7/1998 | Bozler et al. |
| 5,822,110 A | 10/1998 | Dabbaj |
| 5,825,528 A | 10/1998 | Goossen |
| 5,867,302 A | 2/1999 | Fleming et al. |
| 5,896,796 A | 4/1999 | Chih |
| 5,914,803 A | 6/1999 | Hwang et al. |
| 5,920,421 A | 7/1999 | Choi |
| 5,943,155 A | 8/1999 | Goossen |
| 5,943,158 A | 8/1999 | Ford et al. |
| 5,959,763 A | 9/1999 | Bozler et al. |
| 5,972,193 A | 10/1999 | Chou et al. |
| 5,978,127 A | 11/1999 | Berg |
| 5,986,796 A | 11/1999 | Miles |
| 6,028,690 A | 2/2000 | Carter et al. |
| 6,031,653 A | 2/2000 | Wang |
| 6,040,937 A | 3/2000 | Miles |
| 6,097,145 A | 8/2000 | Kastalsky et al. |
| 6,104,525 A | 8/2000 | Min |
| 6,170,332 B1 | 1/2001 | MacDonald et al. |
| 6,201,633 B1 | 3/2001 | Peeters et al. |
| 6,249,039 B1 | 6/2001 | Harvey et al. |
| 6,282,010 B1 | 8/2001 | Sulzbach et al. |
| 6,288,824 B1 | 9/2001 | Kastalsky et al. |
| 6,295,154 B1 | 9/2001 | Laor et al. |
| 6,324,192 B1 | 11/2001 | Tayebati |
| 6,327,071 B1 | 12/2001 | Kimura et al. |
| 6,351,329 B1 | 2/2002 | Greywall |
| 6,391,675 B1 | 5/2002 | Ehmke et al. |
| 6,407,851 B1 | 6/2002 | Islam et al. |
| 6,447,126 B1 | 9/2002 | Hornbeck |
| 6,449,084 B1 | 9/2002 | Guo |
| 6,466,354 B1 | 10/2002 | Gudeman |
| 6,473,072 B1 | 10/2002 | Comiskey et al. |
| 6,513,911 B1 | 2/2003 | Ozaki et al. |
| 6,522,801 B1 | 2/2003 | Aksyuk et al. |
| 6,537,427 B1 | 3/2003 | Raina |
| 6,577,785 B1 | 6/2003 | Spahn et al. |
| 6,597,490 B2 | 7/2003 | Tayebati |
| 6,602,791 B2 | 8/2003 | Ouellet et al. |
| 6,625,047 B2 | 9/2003 | Coleman, Jr. |
| 6,642,913 B1 | 11/2003 | Kimura et al. |
| 6,653,997 B2 | 11/2003 | Van Gorkom et al. |
| 6,674,562 B1 | 1/2004 | Miles |
| 6,680,792 B2 | 1/2004 | Miles |
| 6,704,475 B2 | 3/2004 | Jin et al. |
| 6,710,908 B2 | 3/2004 | Miles et al. |
| 6,760,146 B2 | 7/2004 | Ikeda et al. |
| 6,778,728 B2 | 8/2004 | Taylor |
| 6,803,534 B1 | 10/2004 | Chen et al. |
| 6,859,301 B1 | 2/2005 | Islam et al. |
| 6,881,535 B2 | 4/2005 | Yamaguchi |
| 6,940,631 B2 | 9/2005 | Ishikawa |
| 6,958,847 B2 | 10/2005 | Lin |
| 6,980,350 B2 | 12/2005 | Hung et al. |
| 6,982,820 B2 | 1/2006 | Tsai |
| 6,987,432 B2 | 1/2006 | Lutz et al. |
| 6,995,890 B2 | 2/2006 | Lin |
| 7,006,272 B2 | 2/2006 | Tsai |
| 7,016,095 B2 | 3/2006 | Lin |
| 7,016,099 B2 | 3/2006 | Ikeda et al. |
| 7,027,202 B1 | 4/2006 | Hunter et al. |
| 7,041,571 B2 | 5/2006 | Strane |
| 7,042,619 B1 | 5/2006 | McGinley et al. |
| 7,042,643 B2 | 5/2006 | Miles et al. |
| 7,110,158 B2 | 9/2006 | Miles |
| 7,119,945 B2 | 10/2006 | Kothari et al. |
| 7,123,216 B1 | 10/2006 | Miles |
| 7,161,730 B2 | 1/2007 | Floyd |
| 7,193,768 B2 | 3/2007 | Lin |
| 7,233,029 B2 | 6/2007 | Mochizuki |
| 7,289,259 B2 | 10/2007 | Chui et al. |
| 7,321,457 B2 | 1/2008 | Heald |
| 7,417,784 B2 | 8/2008 | Sasagawa et al. |
| 2001/0003487 A1 | 6/2001 | Miles |
| 2001/0010953 A1 | 8/2001 | Kang et al. |
| 2001/0026951 A1 | 10/2001 | Vergani et al. |
| 2001/0028503 A1 | 10/2001 | Flanders et al. |
| 2001/0055208 A1 | 12/2001 | Kimura |
| 2002/0031155 A1 | 3/2002 | Tayebati et al. |
| 2002/0054422 A1 | 5/2002 | Carr et al. |
| 2002/0055253 A1 | 5/2002 | Rudhard |
| 2002/0075555 A1 | 6/2002 | Miles |
| 2002/0109899 A1 | 8/2002 | Ohtaka et al. |
| 2002/0110948 A1 | 8/2002 | Huang et al. |
| 2002/0131682 A1 | 9/2002 | Nasiri et al. |
| 2002/0135857 A1 | 9/2002 | Fitzpatrick et al. |
| 2002/0141690 A1 | 10/2002 | Jin et al. |
| 2002/0146200 A1 | 10/2002 | Kudrle et al. |
| 2002/0149850 A1 | 10/2002 | Heffner et al. |
| 2002/0168136 A1 | 11/2002 | Atia et al. |
| 2002/0195681 A1 | 12/2002 | Melendez et al. |
| 2003/0015936 A1 | 1/2003 | Yoon et al. |
| 2003/0036215 A1 | 2/2003 | Reid |
| 2003/0053078 A1 | 3/2003 | Missey et al. |
| 2003/0072070 A1 | 4/2003 | Miles |
| 2003/0091072 A1 | 5/2003 | Wang et al. |
| 2003/0112096 A1 | 6/2003 | Potter |
| 2003/0119221 A1 | 6/2003 | Cunningham et al. |
| 2003/0123126 A1 | 7/2003 | Meyer et al. |
| 2003/0138213 A1 | 7/2003 | Jin et al. |
| 2003/0164350 A1 | 9/2003 | Hanson et al. |
| 2003/0201784 A1 | 10/2003 | Potter |
| 2003/0231373 A1 | 12/2003 | Kowarz et al. |
| 2004/0008396 A1 | 1/2004 | Stappaerts |
| 2004/0051929 A1* | 3/2004 | Sampsell et al. ............ 359/247 |
| 2004/0056742 A1 | 3/2004 | Dabbaj |
| 2004/0058532 A1 | 3/2004 | Miles et al. |
| 2004/0070813 A1 | 4/2004 | Aubuchon |
| 2004/0080035 A1 | 4/2004 | Delapierre |
| 2004/0080807 A1 | 4/2004 | Chen et al. |
| 2004/0100680 A1 | 5/2004 | Huibers et al. |
| 2004/0124073 A1 | 7/2004 | Pillans et al. |
| 2004/0125281 A1 | 7/2004 | Lin |
| 2004/0136045 A1 | 7/2004 | Tran |
| 2004/0136076 A1 | 7/2004 | Tayebati |
| 2004/0150869 A1 | 8/2004 | Kasai |
| 2004/0174583 A1 | 9/2004 | Chen et al. |

| | | | | | | |
|---|---|---|---|---|---|---|
| 2004/0201908 | A1 | 10/2004 | Kaneko | EP | 0 035 299 | 9/1983 |
| 2004/0207497 | A1 | 10/2004 | Hsu et al. | EP | 1 170 618 | 1/2002 |
| 2004/0217919 | A1 | 11/2004 | Pichl et al. | EP | 1 197 778 | 4/2002 |
| 2004/0226909 | A1 | 11/2004 | Tzeng | EP | 1 484 635 | 12/2004 |
| 2004/0240032 | A1 | 12/2004 | Miles | FR | 2824643 | 10/1999 |
| 2005/0024557 | A1 | 2/2005 | Lin | JP | 06301054 | 10/1994 |
| 2005/0046919 | A1 | 3/2005 | Taguchi et al. | JP | 08293580 | 11/1996 |
| 2005/0046922 | A1 | 3/2005 | Lin et al. | JP | 2002-277771 | 9/2002 |
| 2005/0078348 | A1 | 4/2005 | Lin | JP | 2002-341267 | 11/2002 |
| 2005/0128565 | A1 | 6/2005 | Ljungblad | JP | 2003-021798 | 1/2003 |
| 2005/0195467 | A1 | 9/2005 | Kothari et al. | JP | 2003-215475 | 7/2003 |
| 2005/0249966 | A1 | 11/2005 | Tung et al. | JP | 2004157527 | 6/2004 |
| 2006/0006138 | A1 | 1/2006 | Lin | WO | WO 02/38491 | 5/2002 |
| 2006/0018348 | A1 | 1/2006 | Przybyla et al. | WO | WO 02/079853 | 10/2002 |
| 2006/0024620 | A1 | 2/2006 | Nikkel et al. | WO | WO 2004/000717 | 12/2003 |
| 2006/0066511 | A1 | 3/2006 | Chui | WO | WO 2005/006364 | 1/2005 |
| 2006/0066932 | A1 | 3/2006 | Chui | WO | WO 2006/073111 | 7/2006 |
| 2006/0066935 | A1 | 3/2006 | Cummings et al. | | | |
| 2006/0077518 | A1 | 4/2006 | Chui et al. | | | |
| 2006/0079048 | A1* | 4/2006 | Sampsell ............... 438/222 | | | |
| 2006/0119922 | A1 | 6/2006 | Faase et al. | | | |
| 2006/0203325 | A1 | 9/2006 | Faase et al. | | | |
| 2007/0019280 | A1 | 1/2007 | Sasagawa et al. | | | |
| 2007/0041703 | A1 | 2/2007 | Wang | | | |
| 2007/0096300 | A1 | 5/2007 | Wang et al. | | | |
| 2007/0170540 | A1 | 7/2007 | Chung et al. | | | |
| 2007/0247401 | A1 | 10/2007 | Sasagawa et al. | | | |
| 2007/0249079 | A1 | 10/2007 | Sasagawa et al. | | | |
| 2007/0279753 | A1 | 12/2007 | Tung et al. | | | |
| 2008/0026328 | A1 | 1/2008 | Miles | | | |
| 2008/0030825 | A1 | 2/2008 | Sasagawa et al. | | | |
| 2008/0094686 | A1 | 4/2008 | U'Ren | | | |
| 2008/0100899 | A1 | 5/2008 | Shimokawa et al. | | | |
| 2008/0144163 | A1 | 6/2008 | Floyd | | | |
| 2008/0151352 | A1 | 6/2008 | Chung et al. | | | |
| 2008/0158645 | A1 | 7/2008 | Chiang | | | |
| 2008/0226929 | A1 | 9/2008 | Chung et al. | | | |
| 2008/0279498 | A1 | 11/2008 | Sampsell et al. | | | |
| 2008/0314866 | A1 | 12/2008 | Chui et al. | | | |

FOREIGN PATENT DOCUMENTS

| | | |
|---|---|---|
| DE | 10228946 | 1/2004 |

OTHER PUBLICATIONS

Fork, et al, "P-67: Chip on Glass Bonding using StressedMetal™ Technology" Sid 05 Digest, May 24, 2005.

Lee et al., "Improvement of the surface characteristics of sputtered metal layer for a MEMS micro-mirror switch," Thin Solid Films, vol. 447, Jan. 30, 2004, pp. 615-618.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.

Goossen et al., "Possible Display Applications of the Silicon Mechanical Anti-Reflection Switch," Society for Information Display (1994).

Joannopoulos et al., "Photonic Crystals: Molding the Flow of Light," Princeton University Press (1995).

Magel, "Integrated Optic Devices Using Micromachined Metal Membranes," SPIE vol. 2686, 0-8194-2060-Mar. (1996).

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

METHOD OF PATTERNING MECHANICAL LAYER FOR MEMS STRUCTURES

BACKGROUND

1. Field

This invention relates to microelectromechanical systems (MEMS) devices and methods for making the same. More particularly, this invention relates to an etching process for making MEMS devices and resulting structures.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In one aspect, a method of making a microelectromechanical system (MEMS) device is provided. The method includes forming a stationary layer over a substrate. A sacrificial layer is formed over the stationary layer. The sacrificial layer is formed of a first material. A mechanical layer is formed over the sacrificial layer. A mask layer is formed of a second material over the mechanical layer. The first and second materials are etchable by a single etchant which is substantially selective for etching the first and second materials relative to the mechanical layer.

In another aspect, a microelectromechanical system (MEMS) comprising an array of MEMS devices is provided. Each of the MEMS devices includes a stationary layer and a movable mirror overlying the stationary layer with a cavity therebetween. The movable mirror is movable in the cavity between a first position and a second position. The first position is a first distance from the stationary layer. The second position is a second distance from the stationary layer. The second distance is greater than the first distance. The movable mirror includes a reflective layer and a mechanical layer overlying the reflective layer. The mechanical layer is formed of nickel or a nickel alloy. The mechanical layer has an area of less than about 62,500 $\mu m^2$. The mechanical layer has a maximum line edge roughness of less than about 0.8 µm.

In yet another aspect, a microelectromechanical system (MEMS) device is provided comprising first electrode means for conducting a first electrical signal and second electrode means for conducting a second electrical signal. The MEMS device further comprises means for supporting the first and second electrode means and means for providing a gap between the first electrode means and the second electrode means. The MEMS device also includes means for patterning the second electrode means with a low edge roughness. The means for patterning is removable without damage to the first and second electrode means.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In fabricating a microelectromechanical systems (MEMS) device, a photolithographic process may be employed to form various elements of the MEMS device, and particularly a mechanical layer of the MEMS device. A hard mask may be used to pattern the mechanical layer to enhance the CD uniformity and edge smoothness thereof. The hard mask may be formed of a material which is removable by an etchant used in releasing a sacrificial layer below the mechanical layer of the MEMS device. This configuration allows the hard mask to be removed without damaging other layers or elements while saving an extra etching step and reducing manufacturing costs.

Figure 1:
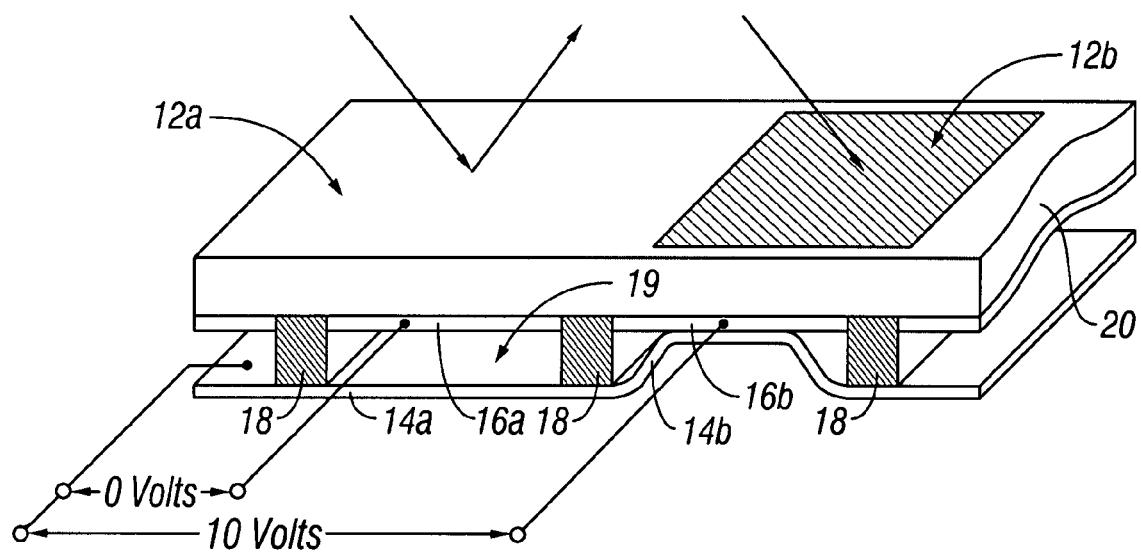
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metallic layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap or cavity 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
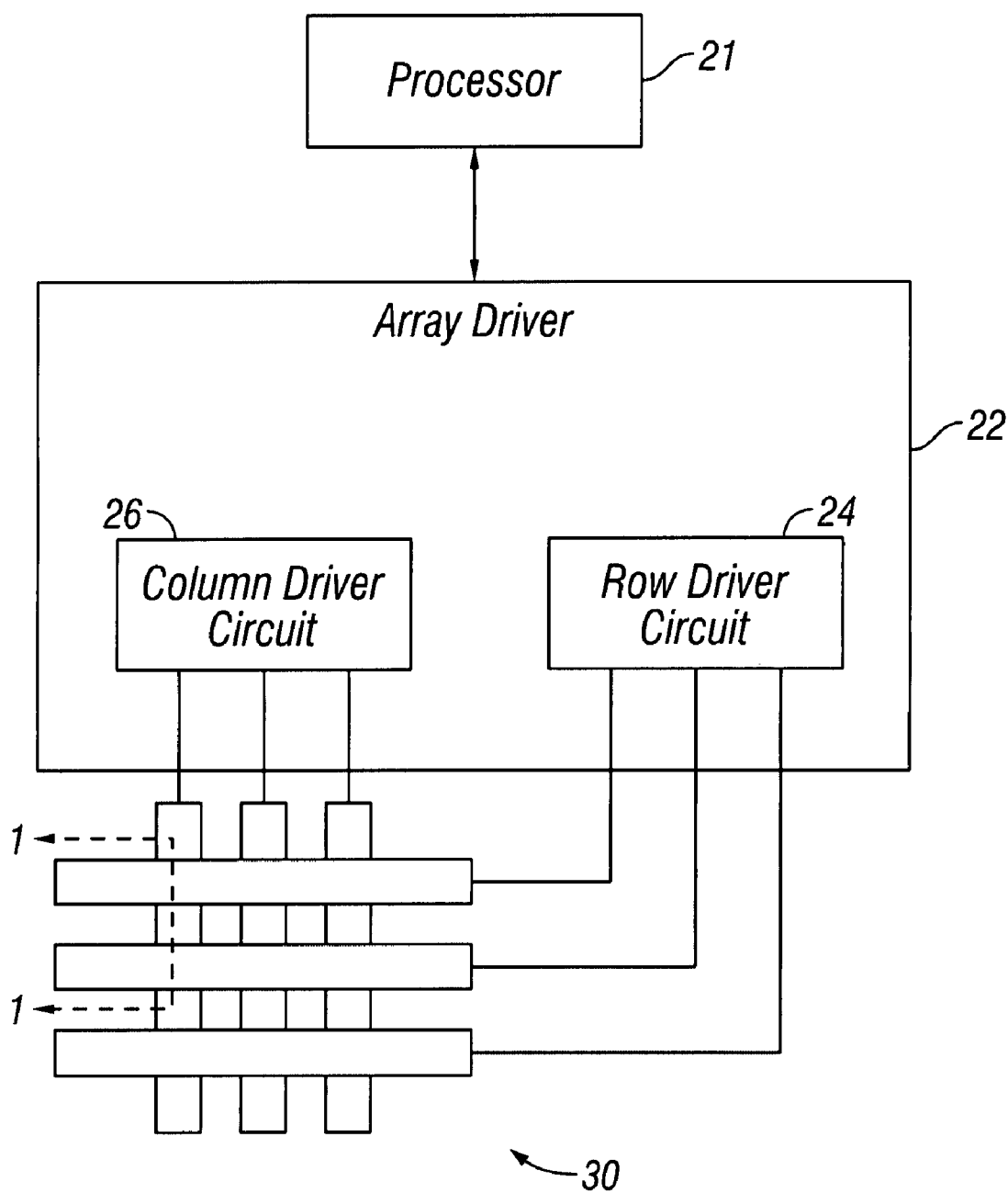
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
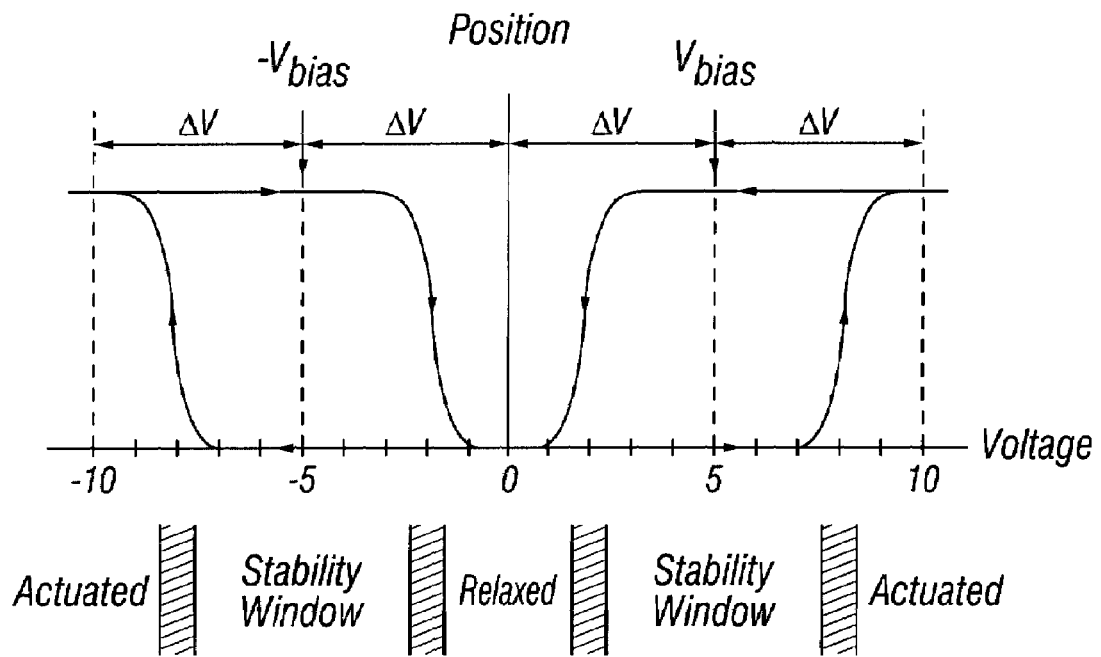
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
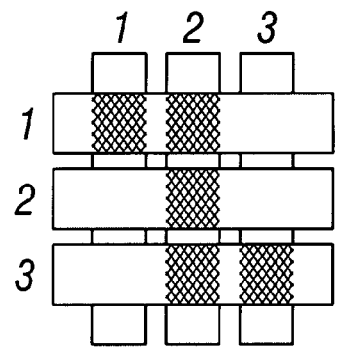
FIGS. 5A and 5B illustrate one exemplary timing diagram for row and column signals that may be used to write a frame of display data to the 3×3 interferometric modulator display of FIG. 2.
Figure 5B:
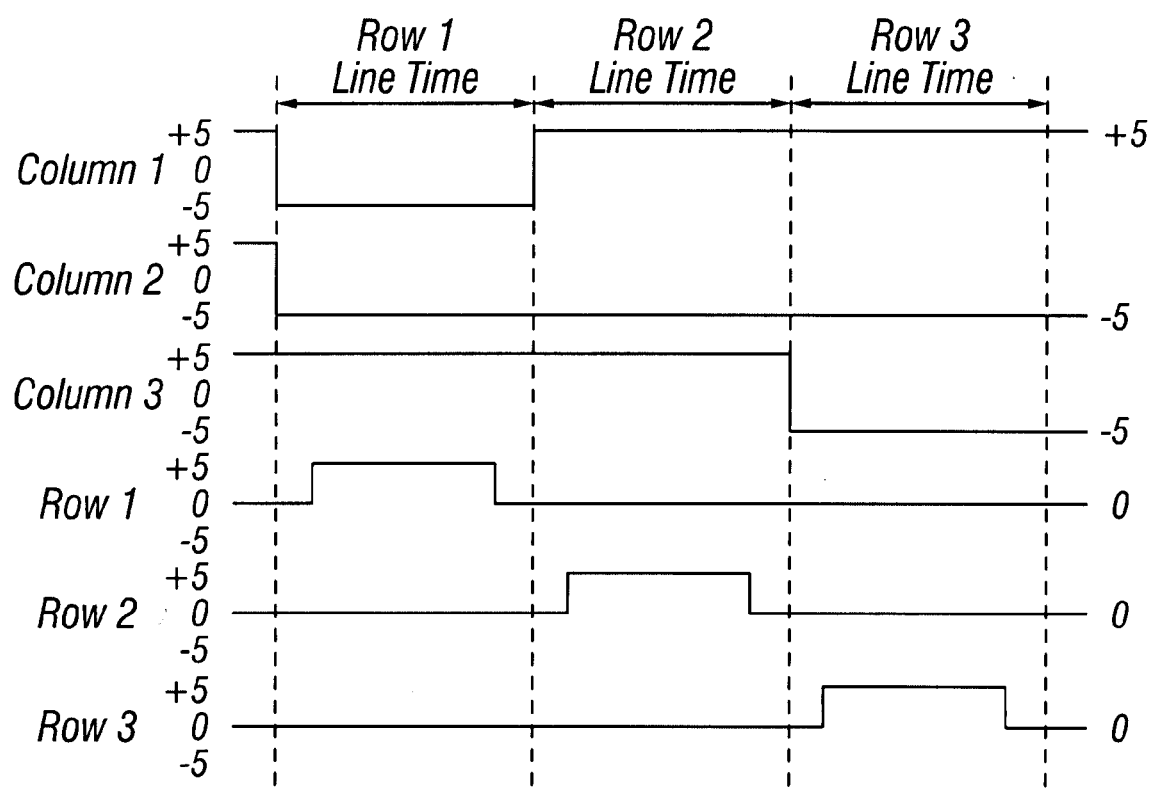

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels, as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
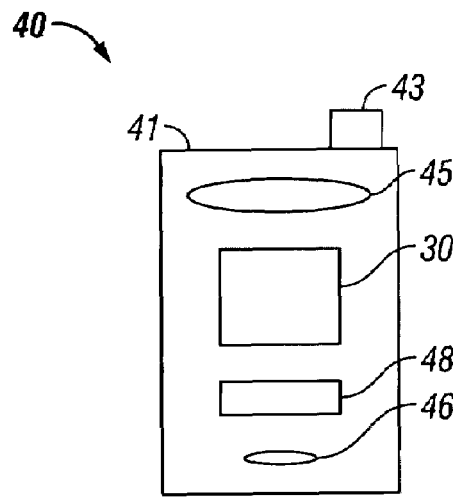
FIGS. 6A and 6B are system block diagrams illustrating an embodiment of a visual display device comprising a plurality of interferometric modulators.
Figure 6B:
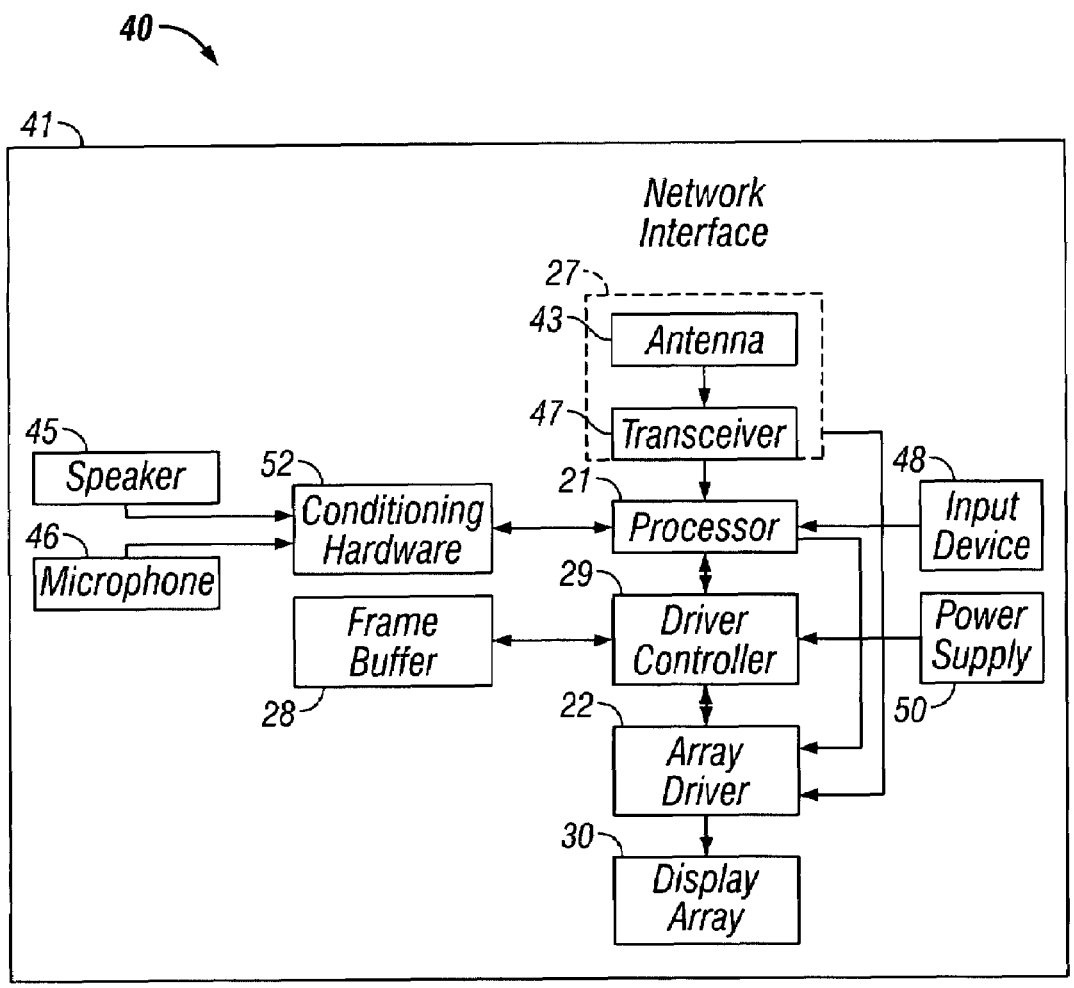

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to the frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The conditioning hardware 52 generally includes amplifiers and filters for transmitting signals to the speaker 45, and for receiving signals from the microphone 46. The conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
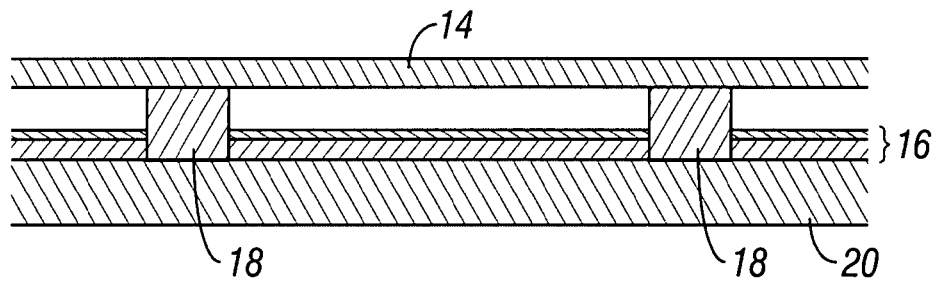
FIG. 7A is a cross section of the device of FIG. 1.
Figure 7B:
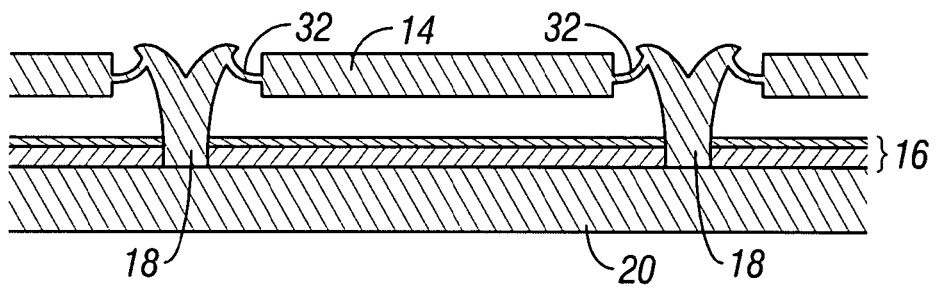
FIG. 7B is a cross section of an alternative embodiment of an interferometric modulator.
Figure 7C:
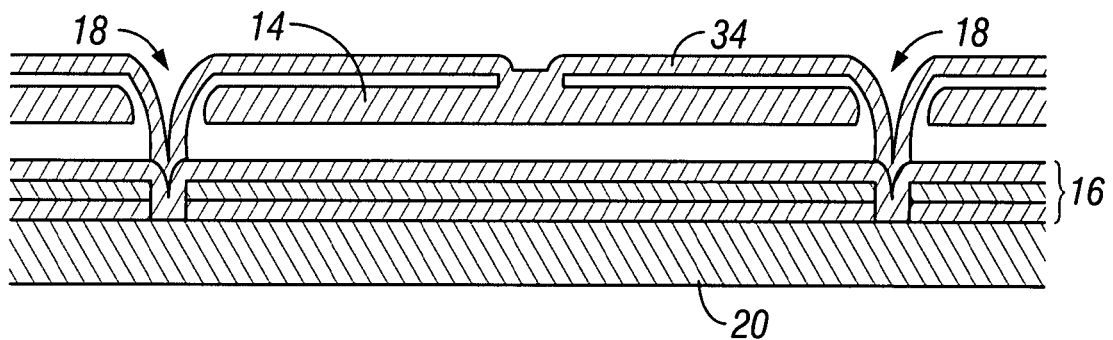
FIG. 7C is a cross section of another alternative embodiment of an interferometric modulator.
Figure 7D:
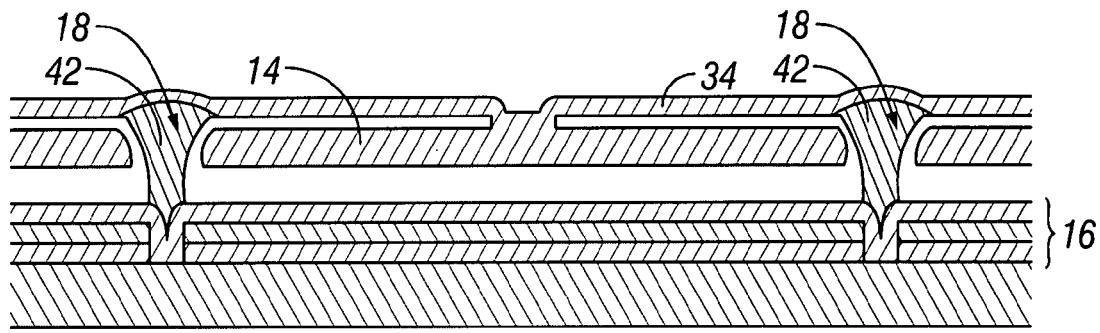
FIG. 7D is a cross section of yet another alternative embodiment of an interferometric modulator.
Figure 7E:
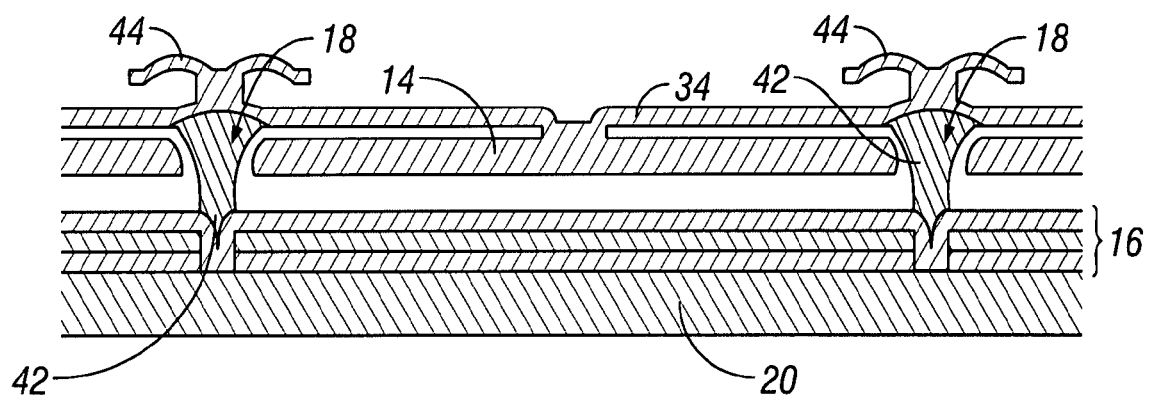
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the movable reflective layer 14 is attached to supports at the corners only, on tethers 32. In FIG. 7C, the movable reflective layer 14 is suspended from a deformable layer 34, which may comprise a flexible metal. The deformable layer 34 connects, directly or indirectly, to the substrate 20 at various locations. The connections are herein referred to as support structures or posts 18. The embodiment illustrated in FIG. 7D has support structures 18 including support post plugs 42 upon which the deformable layer 34 rests. The movable reflective layer 14 remains suspended over the cavity, as in FIGS. 7A-7C, but the deformable layer 34 does not form the support posts 18 by filling holes between the deformable layer 34 and the optical stack 16. Rather, the support posts 18 are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the movable electrode is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Method of Patterning Mechanical Layer

In fabricating a microelectromechanical systems (MEMS) device, photolithographic processes may be employed to form various elements of the MEMS device. Examples of such elements include, but are not limited to, electrodes (fixed and moving electrodes) and support structures of the MEMS device.

However, it has been recognized that conventional photolithographic processes may not be suitable for fabricating MEMS devices in a reduced size. Particularly, it is difficult to achieve uniform critical dimension (CD) and/or smooth edges for the moving electrodes of MEMS devices when etching through a photoresist mask. This is partly because the photoresist mask may not be firmly attached to the underlying moving electrode layer.

A hard mask may be employed to enhance etch quality. The term "hard mask" in the context of this document refers to a mask made of a non-photoresist material, or a mask having a pattern transferred from a photoresist layer, rather than implying a certain hardness. In one arrangement, a hard mask is formed on a target layer. Then, a photoresist is formed and patterned on the hard mask. Subsequently, the pattern in the photoresist is transferred to the hard mask. Then, the underlying target layer is etched through the hard mask with or without the photoresist on top of the hard mask. Then, the hard mask is selectively removed, leaving only the patterned target layer. In some arrangement, two or more hard mask layers may be used.

In the illustrated embodiments, a hard mask is employed for patterning the mechanical layers of a MEMS device. Any material that enable the desired selective etches may be selected for the hard mask. However, the inventors have realized that the removal step of the hard mask may damage other elements in the MEMS device (e.g., the moving and fixed electrodes and support structures), depending on the etch chemistry. For example, use of an aluminum hard mask over a nickel mechanical layer leads to improved adhesion and fidelity to the mask pattern when etching the nickel layer, but the process of etching the aluminum hard mask can cause damage to an underlying aluminum reflector. Even when the reflector is buried under a sacrificial layer (e.g., when making a suspended mirror like FIGS. 7C-7E), the etchant for the aluminum hard mask can penetrate through a thin sacrificial film and then attack the aluminum reflector during removal of the aluminum hard mask.

A method of making a MEMS device according to one embodiment includes using a hard mask to pattern a mechanical layer. In one embodiment, a stationary electrode layer or layers are formed over a substrate. Then, a sacrificial layer is formed over the stationary layer. Subsequently, a mechanical layer is formed over the sacrificial layer. A hard mask layer is formed over the mechanical layer. Then, a photoresist layer is formed and patterned on the hard mask layer. A pattern in the photoresist layer is transferred into the hard mask layer. With or without removing the photoresist layer, the mechanical layer is patterned through the hard mask layer, thus enhancing the CD uniformity and edge smoothness of the mechanical layer. Then, the sacrificial layer is released to provide a gap between the stationary layer and the mechanical layer.

In one embodiment, the hard mask layer is formed of a material which can be removed by the same etchant used in releasing the sacrificial layer. Thus, the hard mask layer is removed simultaneously with the sacrificial layer. The etchant for this release step is highly selective for etching the sacrificial layer and the hard mask layer relative to the other layers or elements of the MEMS device. Therefore, the removal of the hard mask does not damage the other layers or elements. In addition, such removal does not necessitate an extra removal step for the hard mask, thus simplifying the overall process and reducing the manufacturing costs.

Although embodiments in this disclosure are illustrated in the context of forming a mechanical layer, the hard mask may apply to forming other elements of a MEMS device. In addition, embodiments in this disclosure are illustrated in the context of optical MEMS devices, particularly interferometric modulators. The skilled artisan will, however, appreciate that the hard mask described above may apply to other MEMS devices, such as electromechanical capacitive switches.

FIGS. 8A-8K illustrate a method of making MEMS devices, and particularly interferometric modulators, such as those of FIGS. 7A-7E, according to an embodiment. In the illustrated method, a mechanical layer is patterned using a hard mask.

Figure 8A:
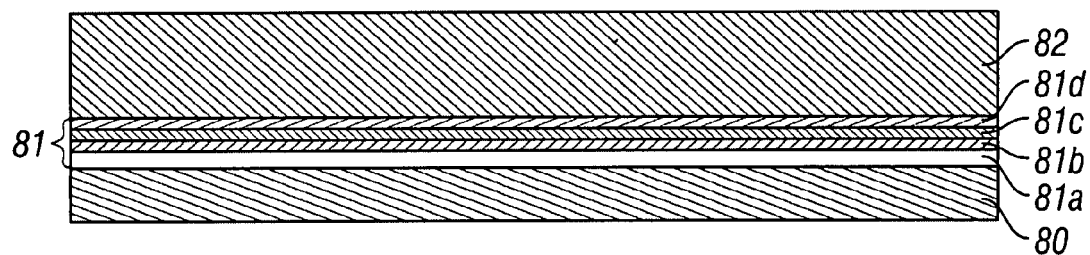
FIGS. 8A-8K are schematic cross sections illustrating a method of making an interferometric modulator having a patterned mechanical layer according to one embodiment.

In FIG. 8A, an optical stack 81 is provided over a transparent substrate 80. The conductor(s) of the optical stack 81 serves as a stationary electrode for the preferred optical MEMS device. In the illustrated embodiment, the optical stack 81 has a transparent conductor in the form of an ITO layer 81a overlying the substrate 80, a metallic or semiconductor absorber layer 81b overlying the ITO layer 81a, a first dielectric layer 81c overlying the absorber layer 81b, and a second dielectric layer 81d overlying the first dielectric layer 81c. The absorber layer 81b is preferably formed of chromium or molybdenum chromium in a thickness that is only partially reflective and partially transparent. In another embodiment for a broad-band white interferometric modulator, the absorber layer 81b may be replaced with a semiconductor layer. The semiconductor layer is preferably formed of germanium. The first dielectric layer 81c may be formed of silicon dioxide. The second dielectric layer 81d may be formed of aluminum oxide and may serve as a protective layer during a release etch of a sacrificial layer, as will be better appreciated from the description of FIG. 8K. In one embodiment, an additional etch stop layer (not shown), such as silicon oxide, can protect the protective layer during patterning of an overlying sacrificial structure. The sacrificial structure may have multiple thicknesses for defining cavities for producing different interferometric colors. In certain embodiments, either of the dielectric layers 81c and 81d may be omitted.

In one embodiment, the ITO layer 81a may have a thickness between about 100 Å and about 800 Å. The absorber layer 81b may have a semitransparent thickness, preferably between about 1 Å and about 100 Å, more preferably between about 10 Å and about 80 Å. The overall thickness of the first and second dielectric layers 81c and 81d may be between about 100 Å and about 1,600 Å. In other embodiments, the thicknesses of the dielectric layers 81c and 81d may be adjusted such that the optical stack 81 is a color filter. In a process not shown here, the ITO layer 81a and the absorber layer 81b are patterned and etched to form lower electrode lines or other useful shapes as required by the display design. The lower electrode lines can be patterned before or after depositing the dielectric layers 81c, 81d. Current convention refers to the lower electrode lines as row electrodes.

Subsequently, a sacrificial layer 82 is formed over the optical stack 81, as shown in FIG. 8A. The sacrificial layer 82 is preferably formed of a material capable of selective removal without harm to other materials that define the cavity. In the illustrated embodiment, the sacrificial layer 82 is formed of molybdenum. Other examples of sacrificial materials that can be selectively removed by fluorine-containing etchants include silicon and tungsten.

Figure 8B:
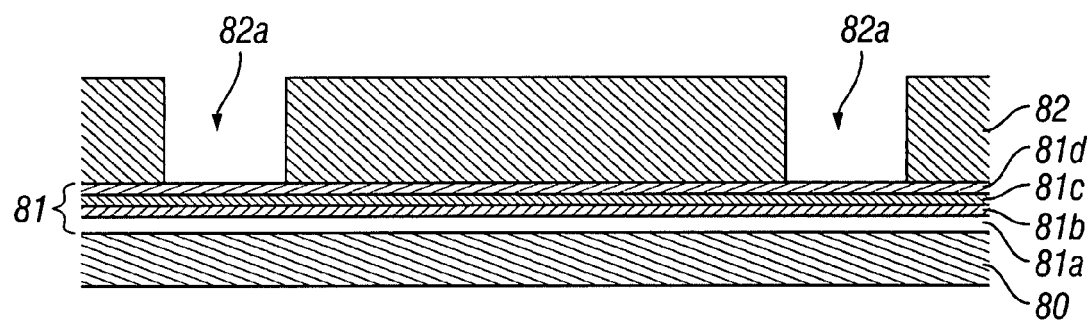

Next, steps for forming support structures, such as rails or posts, are performed. A photolithographic process is performed to pattern the sacrificial layer 82 to provide recesses 82a for posts, as shown in FIG. 8B. In the illustrated embodiment, the recesses 82a of the sacrificial layer 82 have vertical sidewalls. In other embodiments, the recesses of the sacrificial layer may have sloped sidewalls for easier subsequent deposition into the recesses.

Figure 8C:
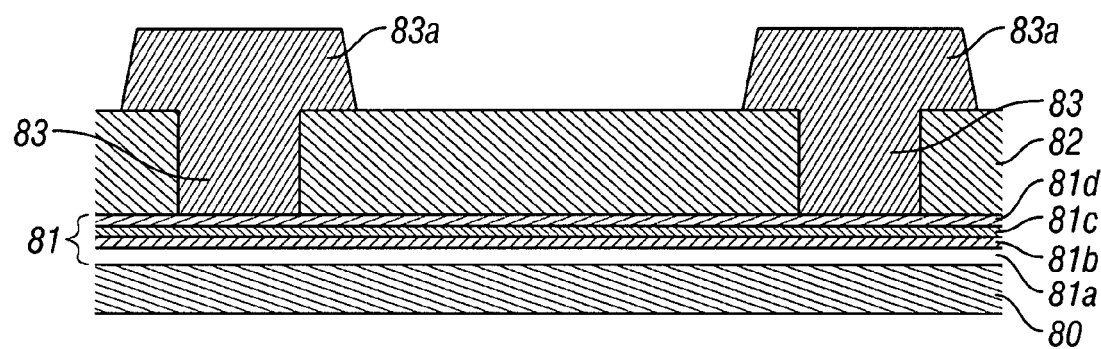

Then, a post-forming material is deposited over the sacrificial layer 82, overfilling the recesses 82a of the sacrificial layer 82. In the embodiments herein, the preferred materials for the posts are inorganic for stability. Portions of the post-forming material that fill the recesses 82a form posts 83. Preferably, though not always, the posts 83 may include wings 83a extending laterally from the posts 83 to add stability and predictability to the mechanical layer's movement. In the illustrated embodiment, the post-forming material over the posts 83 is patterned using a photolithographic process to provide post wings 83a. When forming the post wings 83a, a substantial portion of the post-forming material is removed from the sacrificial layer 82 while leaving some portion of the post-forming material over the posts 83. FIG. 8C illustrates a cross-section of a partially fabricated interferometric modulator structure with the posts 83 and post wings 83a.

Figure 8D:
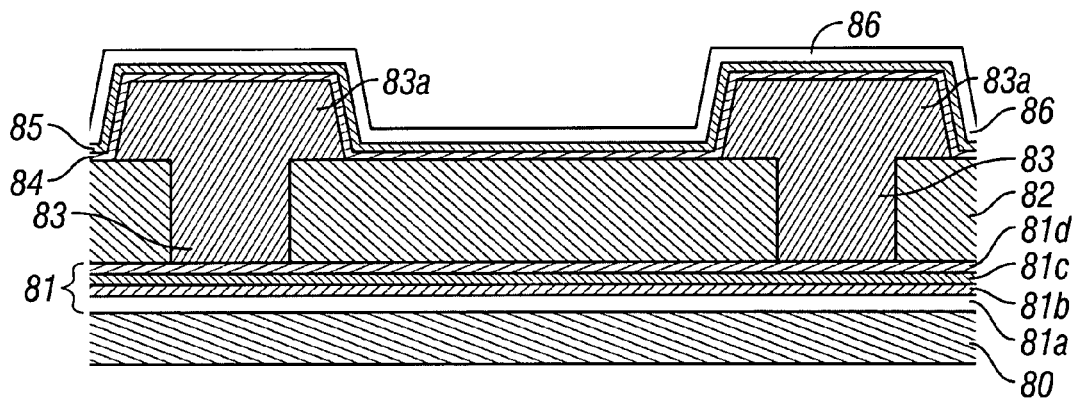

Next, a reflective layer 84 is deposited over the sacrificial layer 82 and over the posts 83 (including the post wings 83a), as shown in FIG. 8D. The reflective layer 84 is preferably formed of a specular metal such as Al, Au, Ag, or an alloy of the foregoing. The reflective layer 84 is thick enough to reflect light incident upon the substrate for interferometric effect. In an exemplary embodiment, the reflective layer 84 has a thickness between about 50 Å and about 1000 Å.

Then, a material for a mechanical or deformable layer 85 is deposited over the reflective layer 84, as shown in FIG. 8D. The material for the mechanical layer 85 is preferably nickel or a nickel alloy. The mechanical layer 85 preferably has a thickness that is sufficient to provide mechanical support while being sufficiently thin and flexible to be movable toward the optical stack 81 under electrostatic attraction in the complete interferometric modulator structure. The mechanical layer 85 may have a thickness on the order of several thousand angstroms. In an exemplary embodiment, the mechanical layer 85 has a thickness of about 1,000 Å to about 5,000 Å. As will be apparent, the schematic cross sections are not to scale. The thicknesses of the layers 84 and 85 can be different in other embodiments. In certain embodiments, both the reflective layer 84 and the mechanical layer 85 may be replaced with a single layer formed of a conductor such as Cu, Pt, Ni, Au, Al, or an alloy of the foregoing. Together the reflective layer 84 and the mechanical layer 85 will define movable electrodes of the electrostatic MEMS devices.

Then, the reflective layer 84 and the mechanical layer 85 are patterned to define an array of interferometric modulators as will be described below. In one embodiment, a hard mask layer 86 is formed on the mechanical layer 85, as shown in FIG. 8D. The hard mask layer 86 may be formed of a material which is etchable by an etchant which will be used at a release step in which the sacrificial layer 82 will be removed. The hard mask material may be the same as that of the sacrificial layer 82. In another embodiment, the hard mask material may be different from that of the sacrificial layer 82. The hard mask material may also be different from that of the reflective layer 84. Examples of the hard mask materials that can be selectively removed with fluorine-based etches include, but are not limited to, molybdenum, silicon (amorphous silicon), titanium, tungsten, and silicon-rich silicon nitride. While removable by the same etchant as the sacrificial layer 82, a wider range of materials can be used for the hard mask layer 86 because the hard mask layer 86 is thinner than the sacrificial layer 82 and need not etch quite as quickly as the sacrificial layer 82. In one embodiment, the hard mask layer 86 may have a thickness between about 10 Å and about 100 μm, and particularly between about 50 Å and about 1000 Å.

Figure 8E:
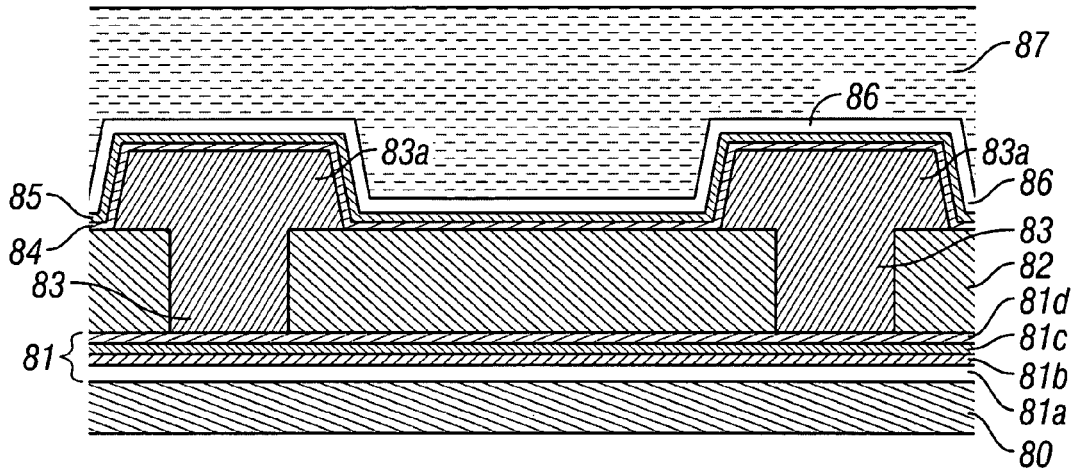

Then, a photoresist layer 87 is formed on the hard mask layer 86, as shown in FIG. 8E. In one embodiment, the photoresist layer 87 may have a thickness between about 0.5 μm and about 10 μm, and particularly between about 1 μm and about 5 μm. The photoresist layer 87 may be formed of any suitable photoresist including, but not limited to, AZ 501 (available from Clariant Corporation, Somerville, N.J., U.S.A.) and ECA4 (available from EC Co. Ltd., Taoyuan, Taiwan).

Figure 8F:
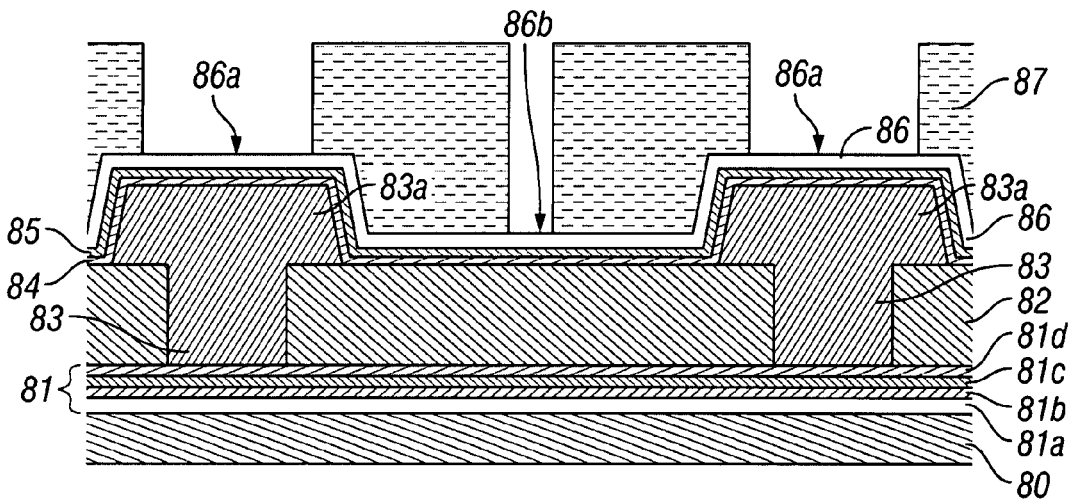

Subsequently, the photoresist layer 87 is patterned using any suitable photolithographic process, as shown in FIG. 8F. In the illustrated embodiment, the photoresist layer 87 is patterned to expose portions 86a of the hard mask layer 86 over the posts wings 83a. In addition, another portion 86b of the hard mask layer 86 is exposed at a midpoint between the posts 83 to provide a through-hole 85b (FIG. 8K). The through-hole will serve to permit an etchant to reach the sacrificial layer 82 more evenly across the array of MEMS devices being formed, rather than entering cavities only from the edges of each device, at a release step which will be described below. In addition, the through-hole provides an exit for air when the reflective layer 84 and the mechanical layer 85 move between the relaxed and actuated positions during the operation of the completed interferometric modulator.

Figure 8G:
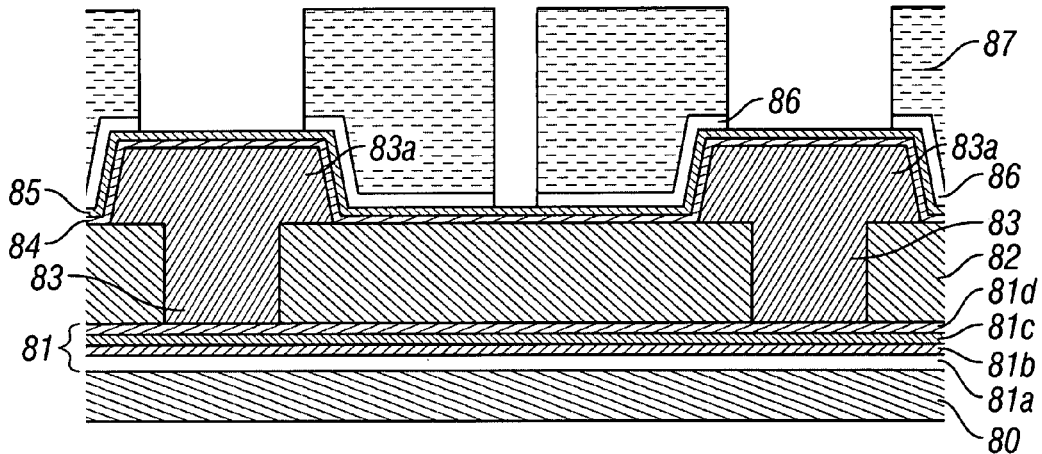

Next, the hard mask layer 86 is etched through the photoresist layer 87, as shown in FIG. 8G. During this step, the pattern of the photoresist layer 87 is transferred into the hard mask layer 86. Any suitable etch process may be used for etching the hard mask layer 86. The etch process may be a dry or wet etch process. An etchant used at this step is preferably selective for the hard mask layer 86 relative to other layers including the photoresist layer 87, the mechanical layer 85, and the reflective layer 84. Examples of the etchant include, but are not limited to, $SF_6/O_2$ and $CF_4/O_2$.

Figure 8H:
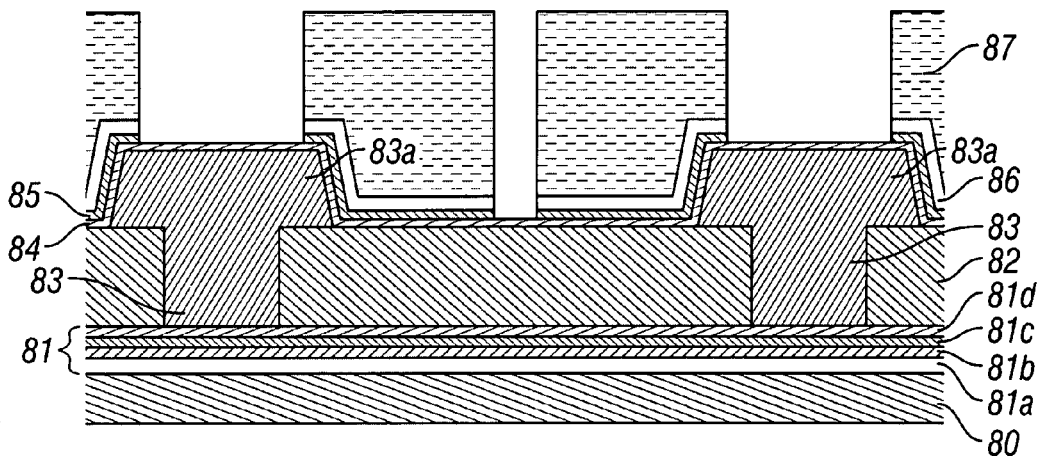

Subsequently, the mechanical layer 85 is etched through the photoresist layer 87 and the hard mask layer 86, as shown in FIG. 8H. Any suitable etch process may be used for etching the mechanical layer 85. The etch process may be a dry or wet etch process. The etchant is preferably selective for etching the mechanical layer 85 relative to the photoresist layer 87 and the hard mask layer 86. The etchant, however, need not be extremely highly selective. An exemplary etchant for selectively etching a Ni mechanical layer without undue etching of a molybdenum hard mask 86 is diluted nitric acid. The hard mask layer 86 adheres to the underlying mechanical layer 85 more firmly than the photoresist layer would without an intervening hard mask layer. Thus, the hard mask layer 86 can enhance the CD uniformity and the edge smoothness of the mechanical layer 85. The CD uniformity and edge smoothness may improve the process margin of the mechanical layer 85. Thus, the interferometric modulator may be formed in a desired size.

Figure 8I:
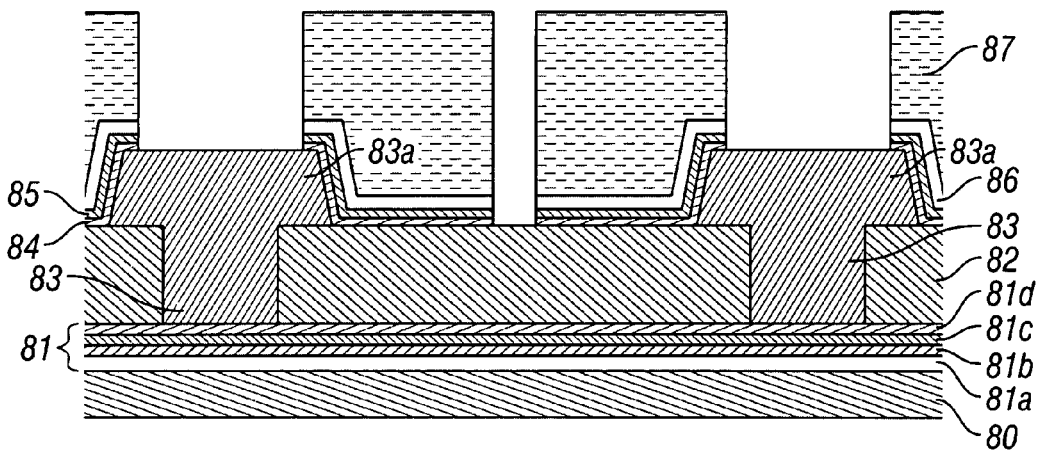

The reflective layer 84 is then etched through the photoresist layer 87, the hard mask layer 86, and the mechanical layer 85, as shown in FIG. 8I. Any suitable etch process may be used for etching the reflective layer 84. The etch process may be a dry or wet etch process. The etchant is preferably selective for etching the reflective layer 84 relative to the photoresist layer 87 and the hard mask layer 86. The etchant, however, need not be extremely highly selective. Examples of etchants for etching an Al reflective layer include, but are not limited to, phosphoric acid and tetramethylammonium hydroxide (TMAH). In certain embodiments, the reflective layer 84 may be etched using the same etchant as that for etching the mechanical layer 85.

Figure 8J:
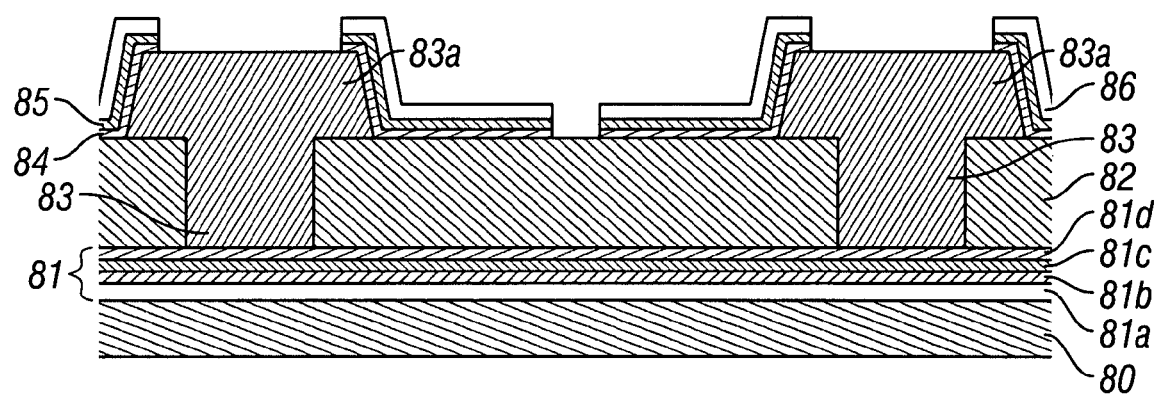
Figure 8K:
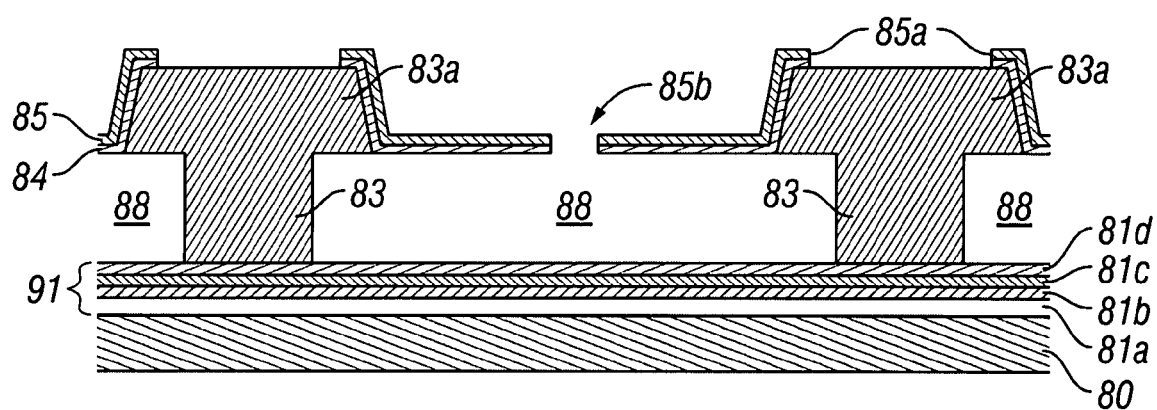

Subsequently, the photoresist layer 87 is removed from the hard mask layer 86, as shown in FIG. 8J. The photoresist layer 87 may be removed using any suitable solution or ashing process.

Finally, the sacrificial layer 82 and the hard mask layer 86 are selectively removed using any suitable etch process, either a dry or wet etch process, preferably simultaneously in a single etch process. This step is referred to as a "release" or "sacrificial etch" step. The sacrificial layer 82 is selectively removed, leaving a cavity or gap 88 between the reflective layer 84 and the optical stack 81, as shown in FIG. 8K. The illustrated sacrificial layer 82, which is formed of molybdenum, is preferably etched using a fluorine-based etchant, for example, a $XeF_2$-based etchant, which selectively etches molybdenum with very high selectivity (preferably greater than about 10:1, more preferably greater than about 20:1, and most preferably about 50:1) without attacking other exposed materials ($Al_2O_3$, Al, etc.) that define the cavity 88.

As noted, the hard mask layer 86 is also removed at this step. As described above, the hard mask layer 86 is preferably formed of a material etchable by a single etchant which is substantially selective for etching the sacrificial layer 82 and the hard mask layer 86 relative to the other layers (e.g., the mechanical layer 85 and the reflective layer 84). In the illustrated embodiment, the hard mask layer 86 is removed by the fluorine-based etchant used at the sacrificial layer release step. In one embodiment, both the sacrificial layer 82 and the hard mask layer 86 are formed of molybdenum. Because the etchant is selective for etching the hard mask layer 86 and the sacrificial layer 82 relative to the other layers, the hard mask layer 86 may be removed without damaging the other layers or elements (e.g., the reflective layer 84 or optical stack 81 or routing circuitry). In addition, the hard mask layer 86 is removed simultaneously with the sacrificial layer 82 at this single step. Therefore, an extra step for removing the hard mask layer 86, and the attendant damage such separate removal can cause, are avoided. It is particularly beneficial when the sacrificial layer 82 and the hard mask layer 86 are formed of one or a combination of Mo, W, Si, Ti, or Si-rich SiN (where the materials of the sacrificial layer 82 and hard mask 86 can be the same or different from one another), all of which can be removed with extremely high selectivity (preferably greater than about 10:1, more preferably about 20:1, and most preferably about 50:1) relative to Ni or Al.

FIG. 8K illustrates a cross-section of a completed "released" interferometric modulator structure. The interferometric modulator structure includes the mechanical layer 85 patterned to have edge portions 85a and through-holes 85b with improved CD uniformity and edge smoothness.

Although not illustrated, a skilled artisan will appreciate that different steps may be performed to form electrode structures having options such as tethered or suspended moving electrode, as shown in FIGS. 7B-7E. In certain embodiments, multiple interferometric modulators can be formed to have different gap sizes between fixed and stationary electrodes thereof to provide an array of multi-color interferometric modulators. Such multi-color interferometric modulators can be formed using sacrificial layers of different thicknesses. Although not illustrated, a skilled artisan will appreciate that the hard mask layer described above may apply to forming other elements of the interferometric modulators of FIGS. 7A-7E.

FIGS. 9A-9K illustrate a method of making an interferometric modulator according to another embodiment. In the illustrated method, a mechanical layer is patterned using a hard mask.

Figure 9A:
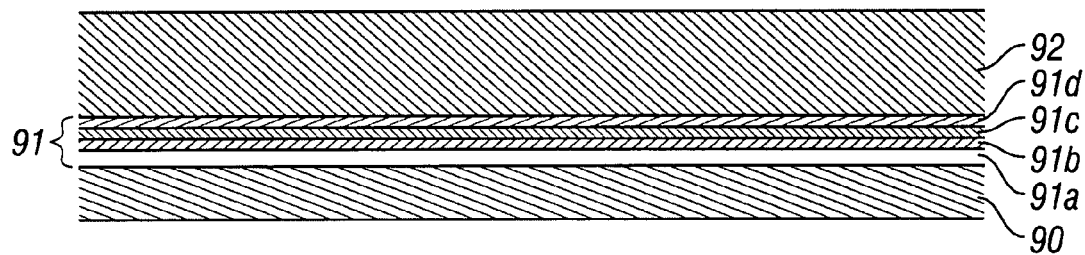
FIGS. 9A-9K are schematic cross sections illustrating a method of making an interferometric modulator having a patterned mechanical layer according to another embodiment.

In FIG. 9A, an optical stack 91 is provided over a transparent substrate 90. In the illustrated embodiment, the optical stack 91 has a transparent conductor in the form of an ITO layer 91a overlying the substrate 90, a metallic or semiconductor absorber layer 91b overlying the ITO layer 91a, a first dielectric layer 91c overlying the absorber layer 91b, and a second dielectric layer 91d overlying the first dielectric layer 91c. The configurations and materials of the ITO layer 91a, the absorber layer 91b, the first and second dielectric layers 91c, 91d may be as described above with respect to those of the ITO layer 81a, the absorber layer 81b, the first and second dielectric layers 81c, 81d of FIG. 8A, with various alternatives, such as the additional etch stop layer over the second dielectric layer, as noted above.

Subsequently, a sacrificial layer 92 is formed over the optical stack 91, as shown in FIG. 9A. The sacrificial layer 92 is preferably formed of a material capable of selective removal without harm to other materials that define the cavity. In the illustrated embodiment, the sacrificial layer 92 is formed of molybdenum. Other examples of sacrificial materials that can be selectively removed by fluorine-containing etchants include silicon and tungsten.

Figure 9B:
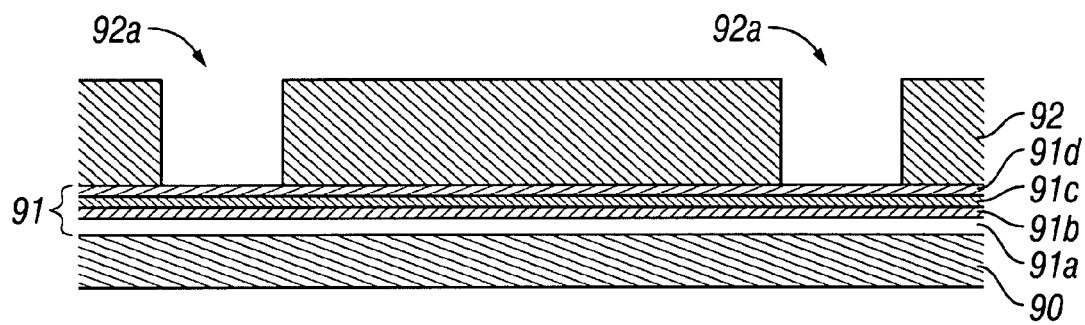

Next, steps for forming support structures, such as rails or posts, are performed. A photolithographic process is performed to pattern the sacrificial layer 92 to provide recesses 92*a* for posts, as shown in FIG. 9B. In the illustrated embodiment, the recesses 92*a* of the sacrificial layer 92 have vertical sidewalls. In other embodiments, the recesses of the sacrificial layer may have sloped sidewalls for easier subsequent deposition into the recesses.

Figure 9C:
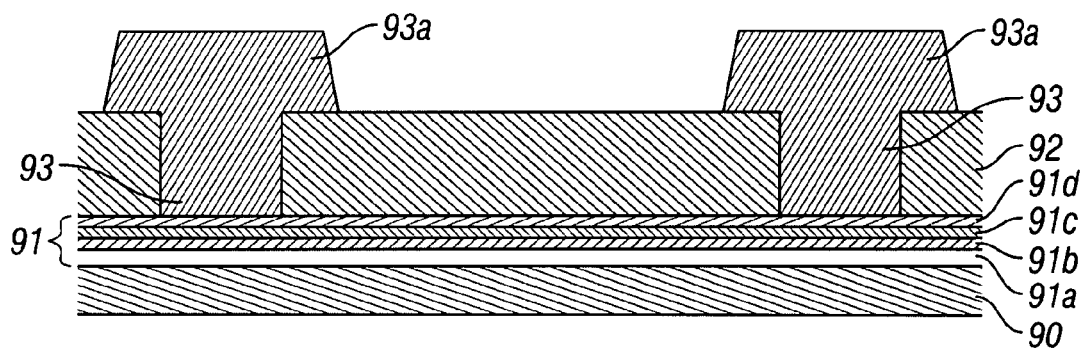

Then, a post-forming material is deposited over the sacrificial layer 92, overfilling the recesses 92*a* of the sacrificial layer 92. In the embodiments herein, the preferred materials for the posts are inorganic for stability. Portions of the post-forming material that fill the recesses 92*a* form posts 93. In the illustrated embodiment, the post-forming material over the posts 93 is patterned using a photolithographic process to provide post wings 93*a*. When forming the post wings 93*a*, a substantial portion of the post-forming material is removed from the sacrificial layer 92 while leaving some portion of the post-forming material over the posts 93. FIG. 9C illustrates a cross-section of a partially fabricated interferometric modulator structure with the posts 93 and post wings 93*a*.

Figure 9D:
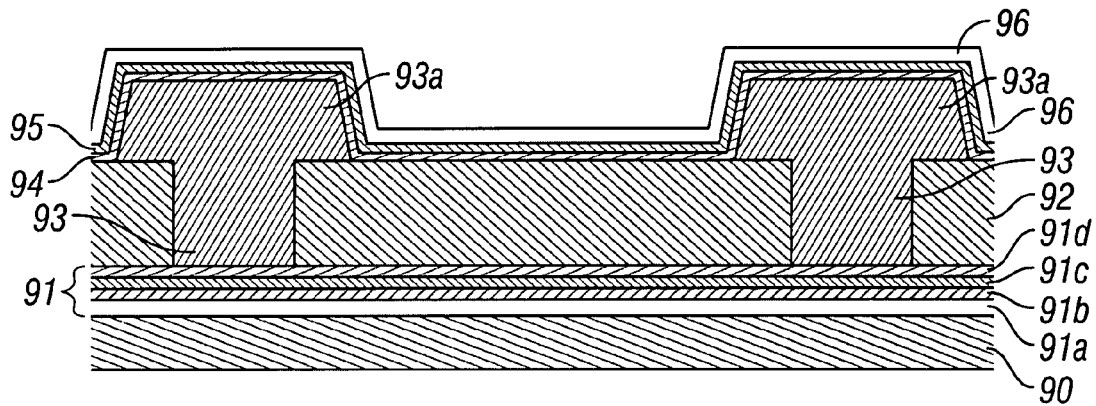

Next, a reflective layer 94 is deposited over the sacrificial layer 92 and over the posts 93 (including the post wings 93*a*), as shown in FIG. 9D. The configuration and material of the reflective layer 94 may be as described above with respect to those of the reflective layer 84 of FIG. 8D. Then, a material for a mechanical or deformable layer 95 is deposited over the reflective layer 94, as shown in FIG. 9D. The configuration and material of the mechanical layer 95 may be as described above with respect to those of the mechanical layer 85 of FIG. 8D.

Then, the reflective layer 94 and the mechanical layer 95 are patterned to define an array of interferometric modulators as will be described below. In one embodiment, a hard mask layer 96 is formed on the mechanical layer 95, as shown in FIG. 9D. In one embodiment, the hard mask layer 96 is formed of a material which is etchable by an etchant which will be used at a sacrificial layer release step in which the sacrificial layer 92 will be removed. The hard mask material may be the same as that of the sacrificial layer 92. In another embodiment, the hard mask material may be different from that of the sacrificial layer 92. The hard mask material may also be different from that of the reflective layer 94. Examples of the material include, but are not limited to, molybdenum, silicon (amorphous silicon), titanium, tungsten, and silicon-rich silicon nitride. While removable by the same etchant as the sacrificial layer 92, a wider range of materials can be used for the hard mask layer 96 because the hard mask layer 96 is thinner than the sacrificial layer 92 and need not etch quite as quickly as the sacrificial layer 92. In one embodiment, the hard mask layer 96 may have a thickness between about 10 Å and about 100 μm, and particularly between about 50 Å and about 1,000 Å.

Figure 9E:
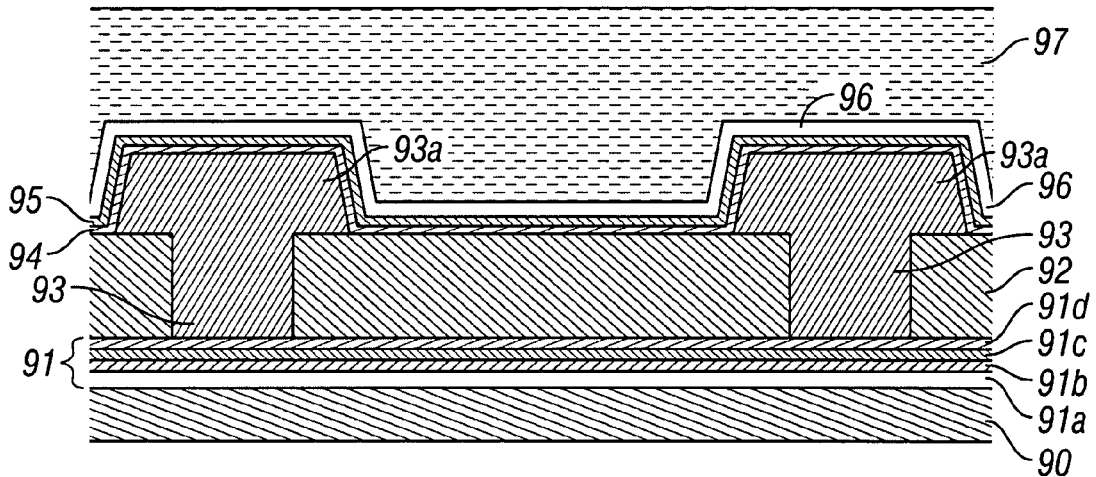
Figure 9F:
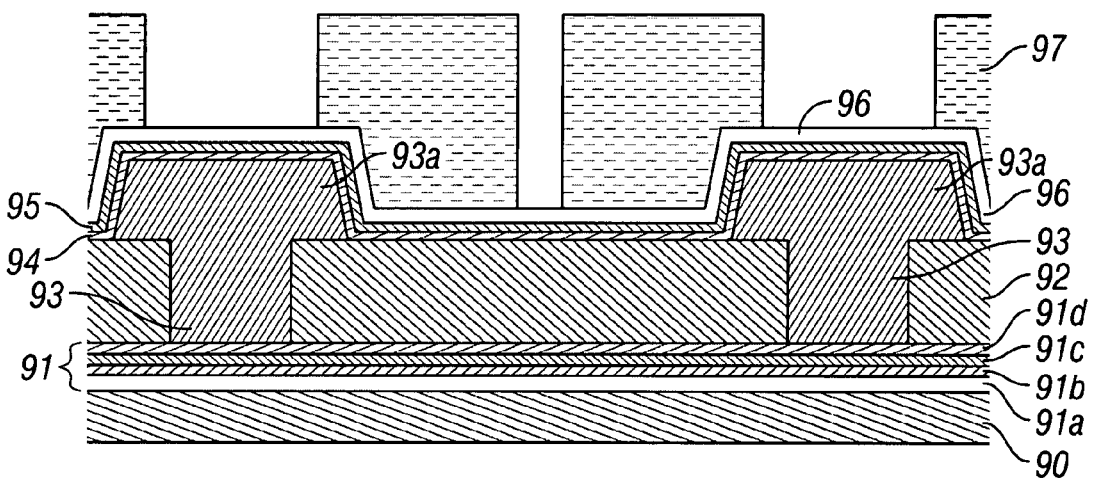

Then, a photoresist layer 97 is formed on the hard mask layer 96, as shown in FIG. 9E. The configuration of the photoresist layer 97 may be as described above with respect to that of the photoresist layer 87 of FIG. 8E. Subsequently, the photoresist layer 97 is patterned using any suitable photolithographic process, as shown in FIG. 9F. The photoresist layer 97 may be patterned in the same manner as described with respect to the photoresist layer 87 of FIG. 8F.

Figure 9G:
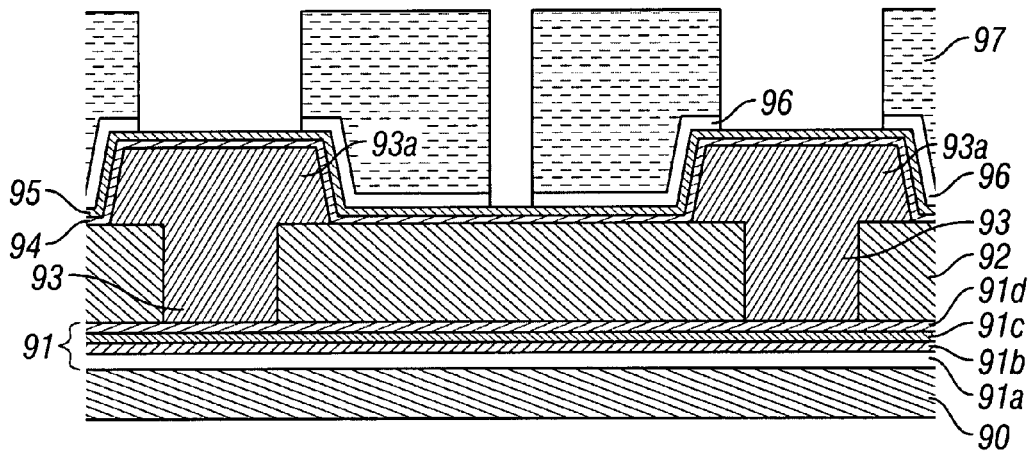

Next, the hard mask layer 96 is etched through the photoresist layer 97, as shown in FIG. 9G. During this step, the pattern of the photoresist layer 97 is transferred into the hard mask layer 96. Any suitable etch process may be used for etching the hard mask layer 96. The etch process may be a dry or wet etch process. The etchant is preferably selective for etching the hard mask layer 96 relative to other layers including the photoresist layer 97, the mechanical layer 95, and the reflective layer 94. Examples of the etchant include, but are not limited to, $SF_6/O_2$ and $CF_4/O_2$ (dry etch).

Figure 9H:
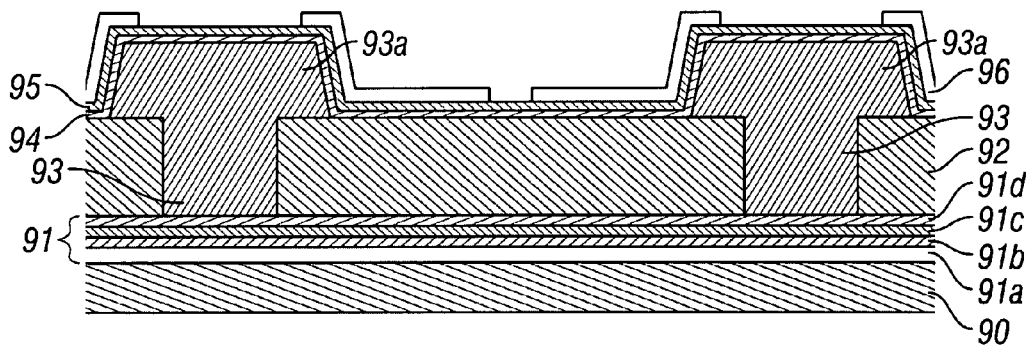

Subsequently, the photoresist layer 97 is removed from the hard mask layer 96, as shown in FIG. 9H. The photoresist layer 97 may be removed using any suitable solution or ashing process.

Figure 9I:
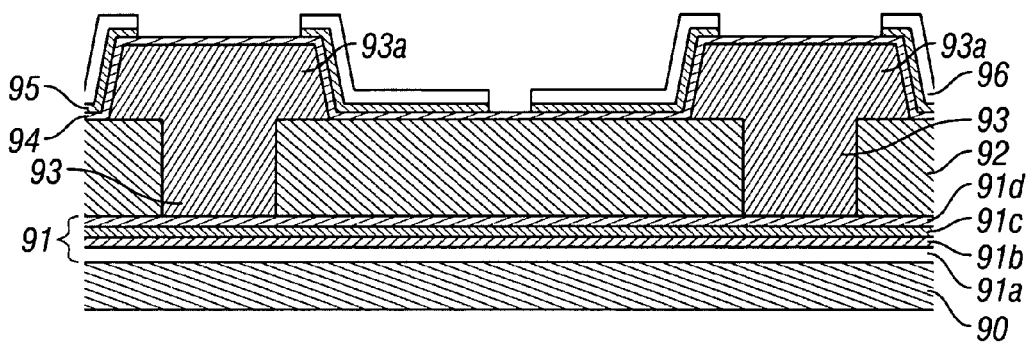

Then, the mechanical layer 95 is etched through the hard mask layer 96, as shown in FIG. 9I. Any suitable etch process may be used for etching the mechanical layer 95. The etch process may be a dry or wet etch process. The etchant is preferably selective for etching the mechanical layer 95 relative to the hard mask layer 96. The etchant, however, need not be extremely highly selective. An exemplary etchant for etching a Ni mechanical layer is diluted nitric acid. The hard mask layer 96 adheres to the underlying mechanical layer 95 better than the photoresist layer would without an intervening hard mask layer. Thus, the hard mask layer 96 can enhance the CD uniformity and the edge smoothness of the patterned mechanical layer 95. The CD uniformity and the edge smoothness may improve the process margin of the mechanical layer 95. Thus, the interferometric modulator can be formed in a desired size.

Figure 9J:
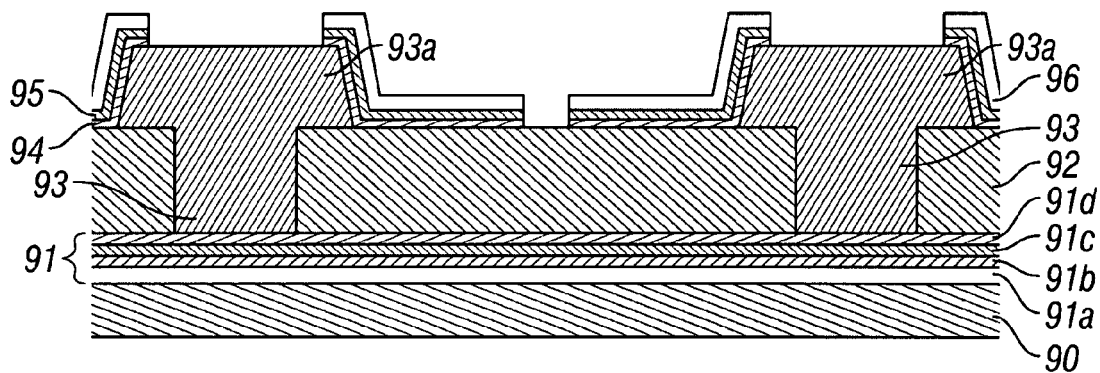

The reflective layer 94 is then etched through the hard mask layer 96 and the mechanical layer 95, as shown in FIG. 9J. Any suitable etch process may be used for etching the reflective layer 94. The etch process may be a dry or wet etch process. The etchant is preferably selective for etching the reflective layer 94 relative to the hard mask layer 96. The etchant, however, need not be extremely highly selective. Examples of etchants for etching an Al reflective layer include, but are not limited to, phosphoric acid and tetramethylammonium hydroxide (TMAH). In certain embodiments, the reflective layer 94 may be etched using the same etchant as that for etching the mechanical layer 95.

Figure 9K:
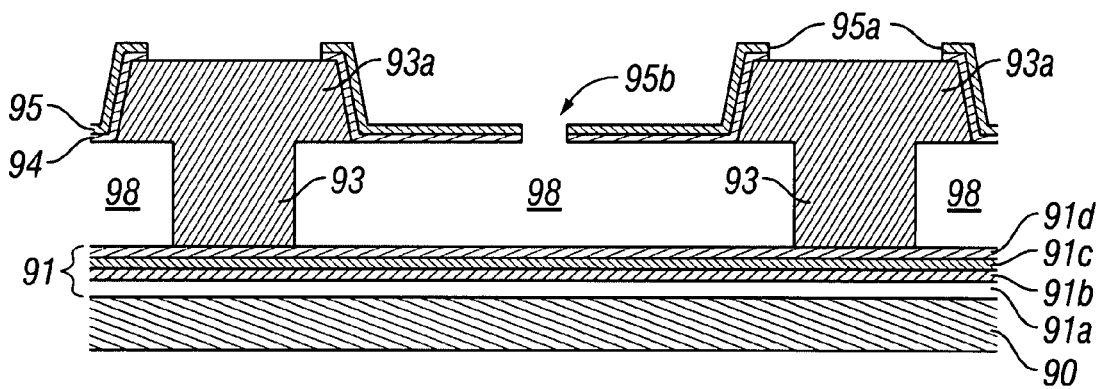

Finally, the sacrificial layer 92 and the hard mask layer 96 are selectively removed using any suitable etch process, either a dry or wet etch process, preferably simultaneously in a single etch process. This step is referred to as a "release" or "sacrificial etch" step. The sacrificial layer 92 is selectively removed, leaving a cavity or gap 98 between the reflective layer 94 and the optical stack 91, as shown in FIG. 9K. The illustrated sacrificial layer 92, which is formed of molybdenum, is preferably etched using a fluorine-based etchant, for example, a $XeF_2$-based etchant, which selectively etches molybdenum with very high selectivity (preferably greater than about 10:1, more preferably greater than about 20:1, and most preferably greater than about 50:1) without attacking other exposed materials ($Al_2O_3$, Al, etc.) that define the cavity 98.

As noted, the hard mask layer 96 is also removed at this step. As described above, the hard mask layer 96 is preferably formed of a material etchable by a single etchant which is substantially selective for etching the sacrificial layer 92 and the hard mask layer 96 relative to the other layer, including the mechanical layer 95 and the reflective layer 94. For example, the hard mask layer 96 is removed by the fluorine-based etchant used in the sacrificial layer release step. In one embodiment, both the sacrificial layer 92 and the hard mask layer 96 are formed of molybdenum. Because the etchant is selective for etching the hard mask layer 96 and the sacrificial layer 92 relative to other layers, the hard mask layer 96 may be removed without damaging the other layers (e.g., the reflective layer 94, the optical stack 91, or routing circuitry). In addition, the hard mask layer 96 is removed simultaneously with the sacrificial layer 92 at this single step. Therefore, an extra step for removing the hard mask layer 96, and the attendant damage such separate removal can cause, are avoided. It is particularly beneficial when the sacrificial layer 92 and the hard mask layer 96 are formed of one or a combination of Mo, W, Si, Ti, or Si-rich SiN (where the materials of the sacrificial layer 92 and hard mask 96 can be the same or different from one another), all of which can be removed with extremely high selectivity (preferably greater than about 10:1, more preferably greater than about 20:1, and most preferably greater than about 50:1) relative to Ni or Al.

FIG. 9K illustrates a cross-section of a completed "released" interferometric modulator structure. The interferometric modulator structure includes the mechanical layer 95 patterned to have edge portions 95a and through-holes 95b with improved CD uniformity and edge smoothness.

Although not illustrated, a skilled artisan will appreciate that different steps may be performed to form electrode structures having options such as tethered or suspended moving electrode, as shown in FIGS. 7B-7E. In certain embodiments, multiple interferometric modulators can be formed to have different gap sizes between fixed and stationary electrodes thereof to provide an array of multi-color interferometric modulators. Such multi-color interferometric modulators can be formed using sacrificial layers of different thicknesses. Although not illustrated, a skilled artisan will appreciate that the hard mask described above may apply to forming other elements of the interferometric modulators of FIGS. 7A-7E.

FIGS. 10A-10J illustrate a method of making an interferometric modulator according to yet another embodiment. In the illustrated method, a mechanical layer is patterned using a hard mask.

Figure 10A:
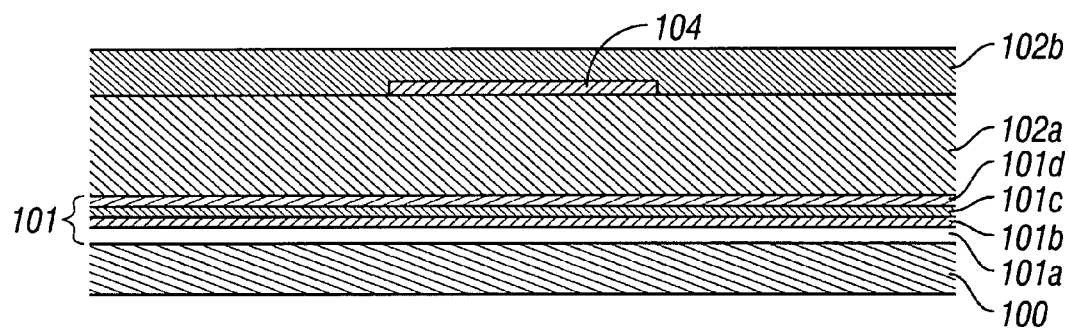
FIGS. 10A-10J are schematic cross sections illustrating a method of making an interferometric modulator having a patterned mechanical layer according to yet another embodiment.

In FIG. 10A, an optical stack 101 is provided over a transparent substrate 100. In the illustrated embodiment, the optical stack 101 has a transparent conductor in the form of an ITO layer 101a overlying the substrate 100, a metallic or semiconductor absorber layer 101b overlying the ITO layer 101a, a first dielectric layer 101c overlying the absorber layer 101b, and a second dielectric layer 101d overlying the first dielectric layer 101c. The configurations and materials of the ITO layer 101a, the absorber layer 101b, the first and second dielectric layers 101c, 101d may be as described above with respect to those of the ITO layer 81a, the absorber layer 81b, the first and second dielectric layers 81c, 81d of FIG. 8A, with various alternatives, such as the additional etch stop layer over the second dielectric layer, as noted above. In a process not shown here, the ITO layer 101a and the absorber layer 101b are patterned and etched to form lower electrode lines or other useful shapes as required by the display design. The lower electrode lines can be patterned before or after depositing the dielectric layers 101c, 101d. Current convention refers to the lower electrode lines as row electrodes.

Subsequently, a first sacrificial layer 102a is formed over the optical stack 101, as shown in FIG. 10A. The first sacrificial layer 102a is preferably formed of a material capable of selective removal without harm to other materials that define the cavity. In the illustrated embodiment, the sacrificial layer 102a is formed of molybdenum, and can be etched by fluorine-based etchants (e.g., XeF$_2$). Other examples of sacrificial materials that can be selectively removed by fluorine-containing etchants include silicon and tungsten.

Next, a reflective layer is formed and patterned over the first sacrificial layer 102a, thereby providing a reflector 104. The material of the reflector 104 may be as described above with respect to that of the reflective layer 84 of FIG. 8D. In certain embodiments, an additional layer(s) can be formed on the reflector 104 to stiffen the reflector 104. Preferably, the additional layer can be formed of a conductive material. Subsequently, a second sacrificial layer 102b is deposited over the reflector 104 and exposed portions of the first sacrificial layer 102a, as shown in FIG. 10A. The second sacrificial layer 102b can be formed of the same material as that of the first sacrificial layer 102a or another material, but preferably can be selectively removed by the same etchant(s) that will selectively remove the first sacrificial layer 102a (e.g., fluorine-based etchants).

Figure 10B:
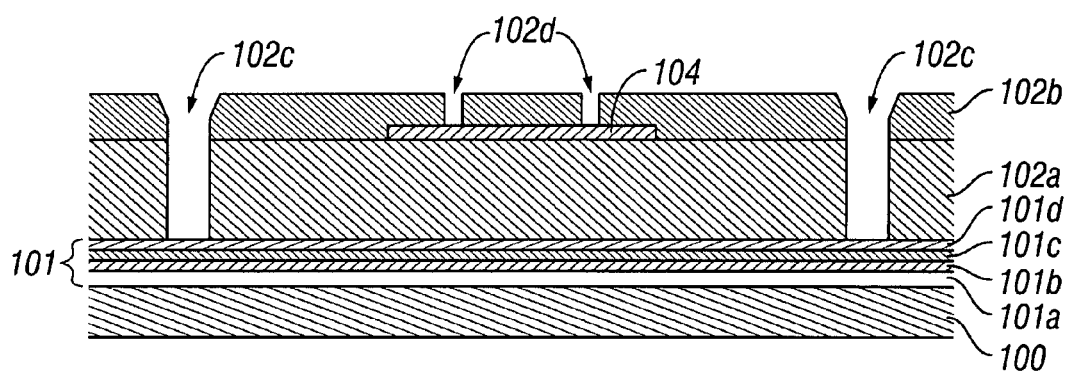

Then, steps for forming support structures (e.g., rails or posts) and reflector connectors are performed. In the illustrated embodiment, the first and second sacrificial layers 102a, 102b are patterned to provide recesses 102c for posts and recesses 102d for reflector connectors, as shown in FIG. 10B. A photolithographic process can be performed to pattern the sacrificial layers 102a, 102b to provide the recesses 102c, 102d.

Then, a post-forming material is deposited over the second sacrificial layer 102b, overfilling the recesses 102c of the sacrificial layers 102a, 102b. In the embodiments herein, the preferred materials for the posts are inorganic (e.g., $SiO_2$ or $Si_3N_4$) for stability. Portions of the post-forming material that fill the recesses 102c form posts 103. In the illustrated embodiment, the post-forming material over the posts 103 is patterned using a photolithographic process to provide post wings 103a. When forming the post wings 103a, a substantial portion of the post-forming material is removed from the second sacrificial layer 102b while leaving some portion of the post-forming material over the posts 103.

Figure 10C:
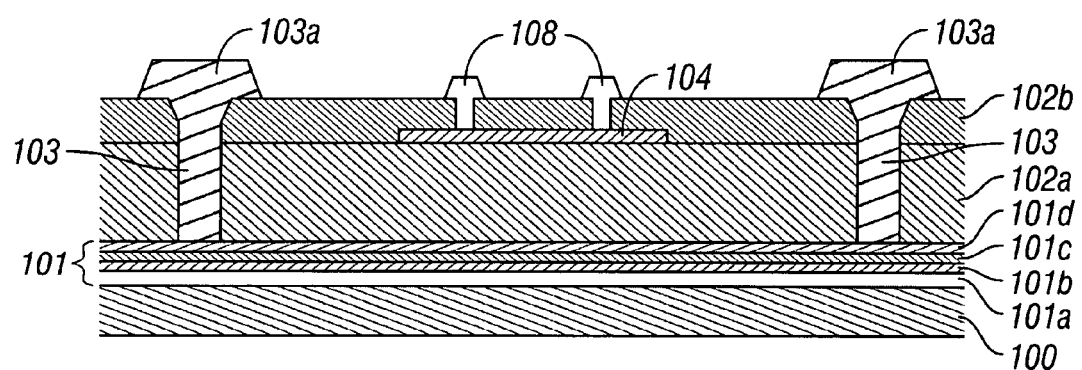

A connector-forming material is deposited and patterned over the second sacrificial layer 102b. Portions of the connector-forming material that fill the recesses 102d form reflector connectors 108. This step can be performed prior to or subsequent to forming the posts 103. FIG. 10C illustrates a cross-section of a partially fabricated interferometric modulator structure with the posts 103 and reflector connectors 108.

Figure 10D:
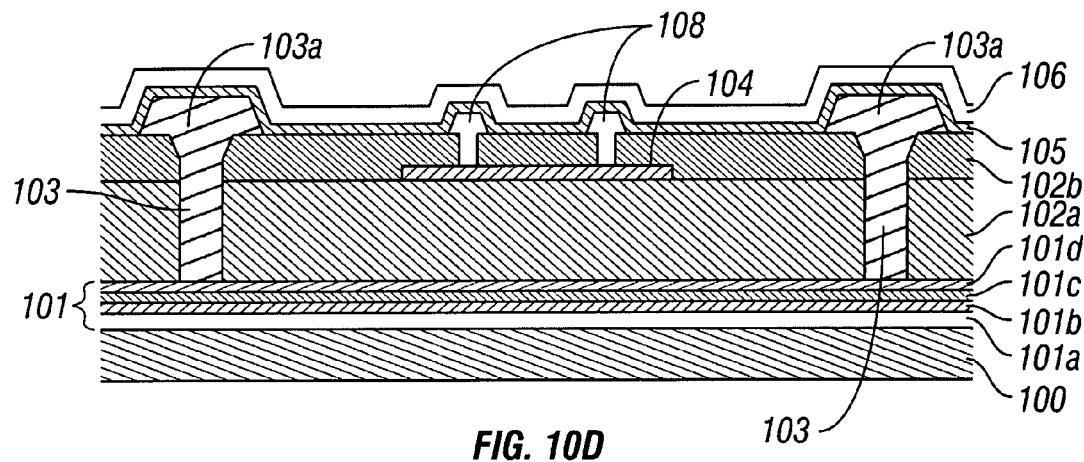

Next, a material for a mechanical or deformable layer 105 is deposited over the second sacrificial layer 102b, posts 103, and reflector connectors 108, as shown in FIG. 10D. The configuration and material of the mechanical layer 105 may be as described above with respect to those of the mechanical layer 85 of FIG. 8D.

In one embodiment, a hard mask layer 106 is formed on the mechanical layer 105, as shown in FIG. 10D. In one embodiment, the hard mask layer 106 is formed of a material which is etchable by an etchant which will be used at a sacrificial layer release step in which the sacrificial layers 102a, 102b will be removed. The hard mask material may be the same as that of the sacrificial layers 102a, 102b. In another embodiment, the hard mask material may be different from that of the sacrificial layers 102a, 102b. The hard mask material may also be different from that of the reflector 104. Examples of the material include, but are not limited to, molybdenum, silicon (amorphous silicon), titanium, tungsten, and silicon-rich silicon nitride. While removable by the same etchant as the sacrificial layers 102a, 102b, a wider range of materials can be used for the hard mask layer 106 because the hard mask layer 106 is thinner than the sacrificial layers 102a, 102b and need not etch quite as quickly as the sacrificial layers 102a, 102b. In one embodiment, the hard mask layer 106 may have a thickness between about 10 Å and about 100 μm, and particularly between about 50 Å and about 1,000 Å.

Figure 10E:
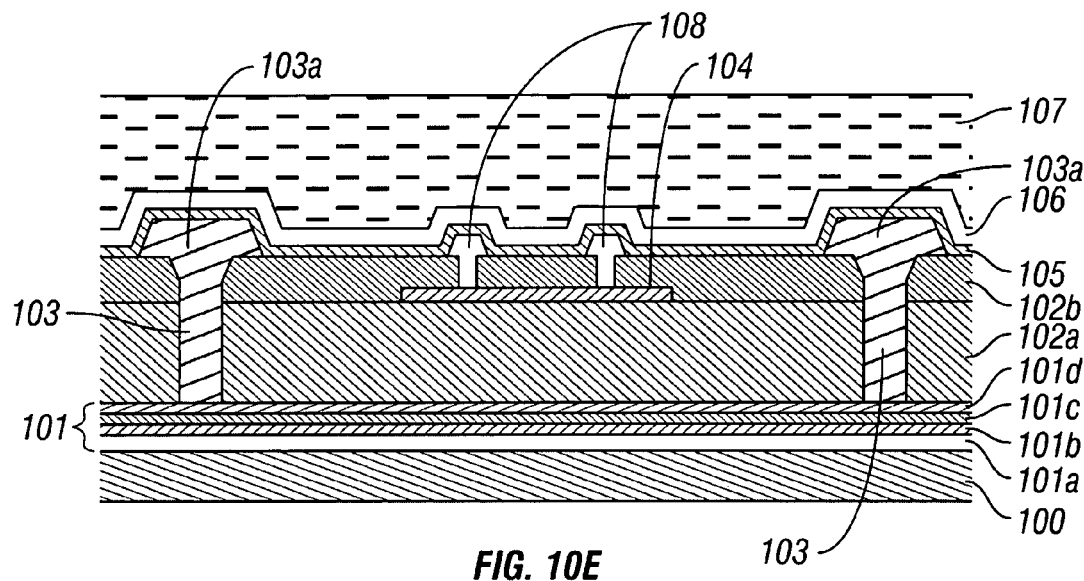
Figure 10F:
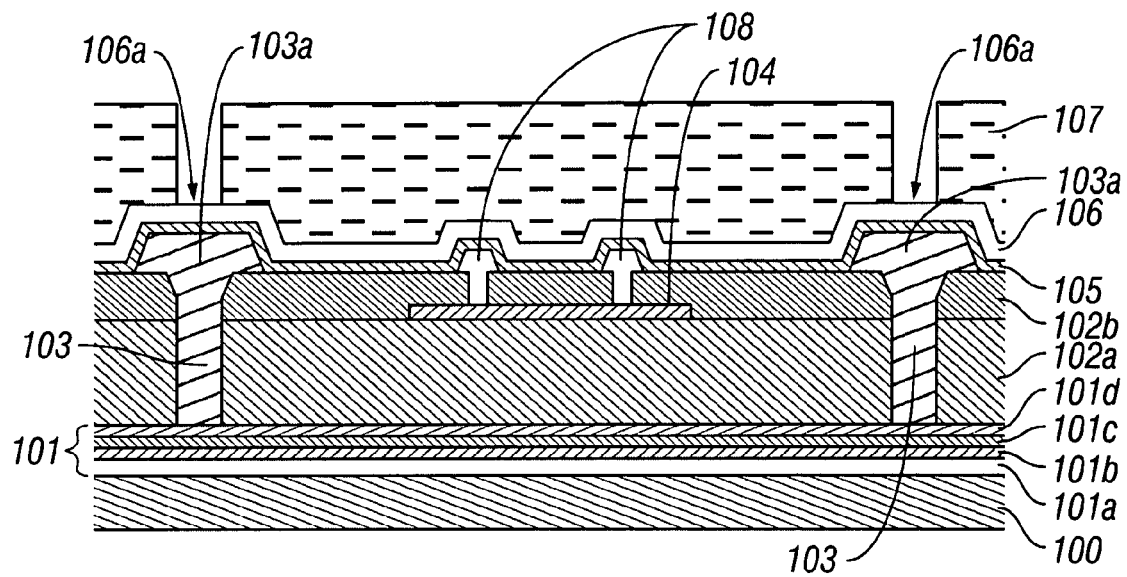

Then, a photoresist layer 107 is formed on the hard mask layer 106, as shown in FIG. 10E. The configuration of the photoresist layer 107 may be as described above with respect to that of the photoresist layer 87 of FIG. 8E. Subsequently, the photoresist layer 107 is patterned using any suitable photolithographic process, as shown in FIG. 10F. In the illustrated embodiment, the photoresist layer 107 may be patterned to expose portions 106a of the hard mask layer 106 over the posts wings 103a. In another embodiment, another portion of the hard mask layer 106 may be exposed at a midpoint between the posts 103 to provide a through-hole similar to the through-hole of FIG. 8K.

Figure 10G:
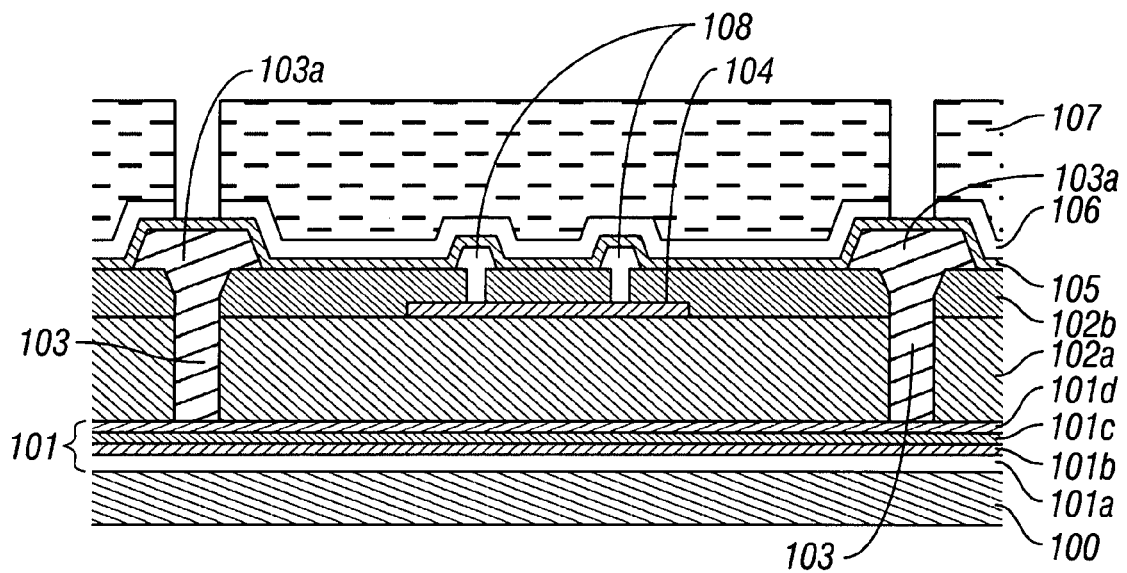

Next, the hard mask layer 106 is etched through the photoresist layer 107, as shown in FIG. 10G. During this step, the pattern of the photoresist layer 107 is transferred into the hard mask layer 106. Any suitable etch process may be used for etching the hard mask layer 106. The etch process may be a dry or wet etch process. The etchant is preferably selective for etching the hard mask layer 106 relative to other layers including the photoresist layer 107 and the mechanical layer 105. Examples of the etchant include, but are not limited to, $SF_6/O_2$ and $CF_4/O_2$ (reactive ion etching).

Figure 10H:
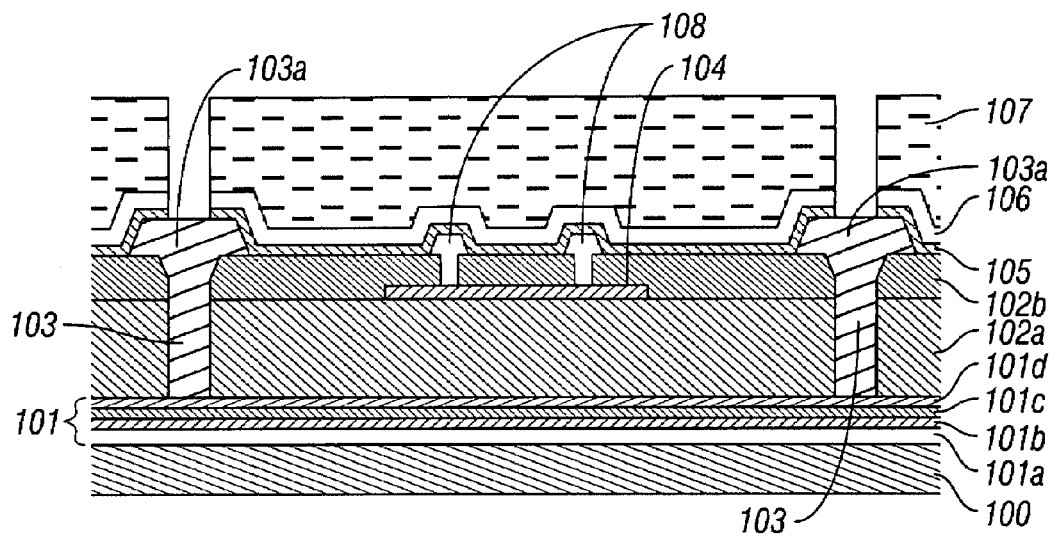

Subsequently, the mechanical layer 105 is etched through the photoresist layer 107 and the hard mask layer 106, as shown in FIG. 10H. Any suitable etch process may be used for etching the mechanical layer 105. The etch process may be a dry or wet etch process. The etchant is preferably selective for etching the mechanical layer 105 relative to the photoresist layer 107 and the hard mask layer 106. The etchant, however, need not be extremely highly selective. An exemplary etchant for selectively etching a Ni mechanical layer 105 without undue attack upon a molybdenum hard mask 106 is diluted nitric acid. The hard mask layer 106 adheres to the underlying mechanical layer 105 more firmly than the photoresist layer would without an intervening hard mask layer. Thus, the hard mask layer 106 can enhance the CD uniformity and the edge smoothness of the mechanical layer 105. The CD uniformity and edge smoothness may improve the process margin of the mechanical layer 105. Thus, the interferometric modulator may be formed in a desired size.

Figure 10I:
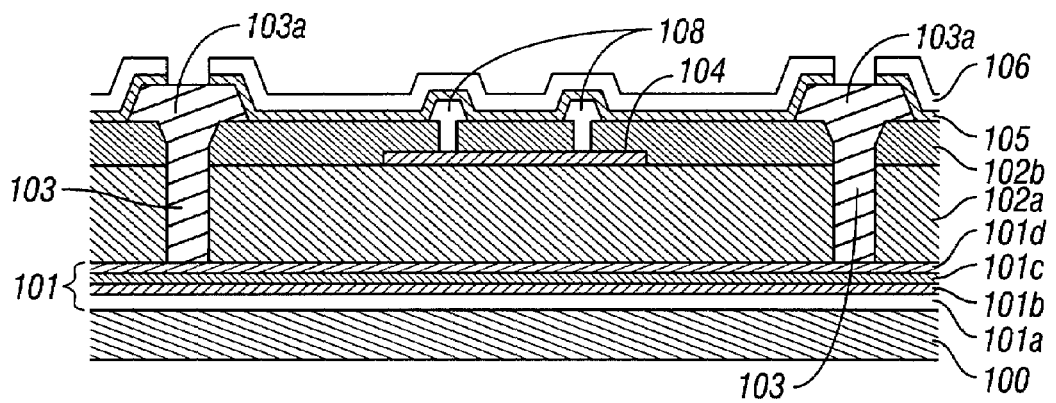

Subsequently, the photoresist layer 107 is removed from the hard mask layer 106, as shown in FIG. 10I. The photoresist layer 107 may be removed using any suitable solution or ashing process.

Figure 10J:
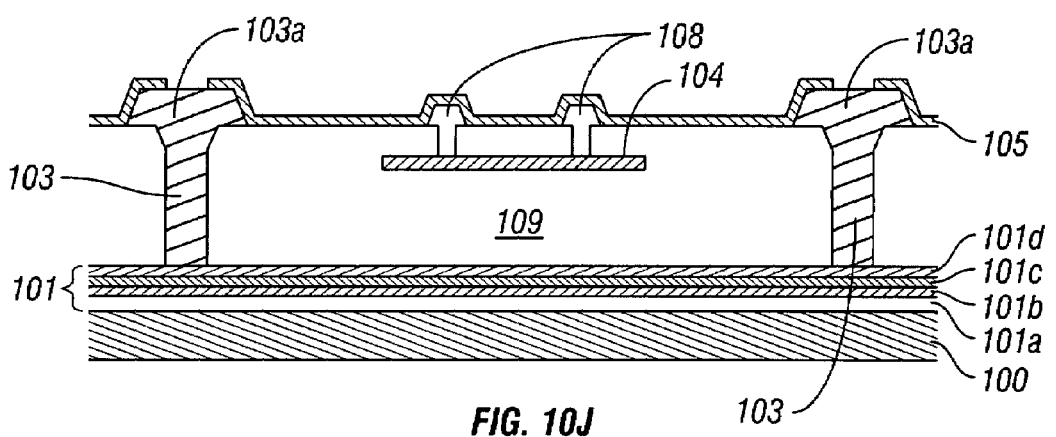

Finally, the sacrificial layers 102a, 102b and the hard mask layer 106 are selectively removed using any suitable etch process, either a dry or wet etch process, preferably simultaneously in a single etch process. This step is referred to as a "release" or "sacrificial etch" step. The sacrificial layers 102a, 102b are selectively removed, leaving a cavity or gap 109 between the reflector 104 and the optical stack 101, as shown in FIG. 10J. The illustrated sacrificial layers 102a, 102b, which are formed of molybdenum, is preferably etched using a fluorine-based etchant, for example, a $XeF_2$-based etchant, which selectively etches molybdenum with very high selectivity (preferably greater than about 10:1, more preferably greater than about 20:1, and most preferably about 50:1) without attacking other exposed materials ($Al_2O_3$, Al, etc.) that define the cavity 109.

As noted, the hard mask layer 106 is also removed at this step. As described above, the hard mask layer 106 is preferably formed of a material etchable by a single etchant which is substantially selective for etching the sacrificial layers 102a, 102b and the hard mask layer 106 relative to the other layers (e.g., the mechanical layer 105, the reflector 104, and the upper dielectric layer 101d). In the illustrated embodiment, the hard mask layer 106 is removed by the fluorine-based etchant used at the sacrificial layer release step. In one embodiment, all of the sacrificial layers 102a, 102b and the hard mask layer 106 are formed of molybdenum. Because the etchant is selective for etching the hard mask layer 106 and the sacrificial layers 102a, 102b relative to the other layers, the hard mask layer 106 may be removed without damaging the other layers or elements (e.g., the reflector 104 or optical stack 101 or routing circuitry). In addition, the hard mask layer 106 is removed simultaneously with the sacrificial layers 102a, 102b at this single step. Therefore, an extra step for removing the hard mask layer 106, and the attendant damage such separate removal can cause, are avoided. It is particularly beneficial when the sacrificial layers 102a, 102b and the hard mask layer 106 are formed of one or a combination of Mo, W, Si, Ti, or Si-rich SiN (where the materials of the sacrificial layers 102a, 102b and hard mask 106 can be the same or different from one another), all of which can be removed with extremely high selectivity (preferably greater than about 10:1, more preferably about 20:1, and most preferably about 50:1) relative to Ni or Al.

FIG. 10J illustrates a cross-section of a completed "released" interferometric modulator structure. The interferometric modulator structure includes the mechanical layer 105 patterned to have edge portions 105a with improved CD uniformity and edge smoothness.

Although not illustrated, a skilled artisan will appreciate that the steps of the embodiment shown in FIGS. 9A-9K may also be adapted for forming the electrode structure of FIG. 10J. In certain embodiments, multiple interferometric modulators can be formed to have different gap sizes between fixed and stationary electrodes thereof to provide an array of multi-color interferometric modulators. Such multi-color interferometric modulators can be formed using sacrificial layers of different thicknesses.

Mechanical Layer with Enhanced Line Edge Smoothness/CD Uniformity

MEMS devices fabricated according to the embodiments described above may have a mechanical layer having enhanced CD uniformity and edge smoothness resulting from the use of the hard mask layer. The term "edge" in the context of this document refers to edge portions 85a, 95a, 105a of the mechanical layer 85, 95, 105 and/or the boundaries of the through-holes 85b, 95b in the mechanical layer 85, 95.

FIGS. 8J, 9J, and 10I illustrate partial cross-sections of completed and "unreleased" interferometric modulator structures. In certain embodiments, the "unreleased" interferometric modulator structures can be transported to a packaging facility to release the sacrificial layer 82, 92, 102a, 102b and the hard mask layer 86, 96, 106 thereof. Then, the resulting interferometric modulator structures can be packaged. In some embodiments, the interferometric modulator structures can be diced before or after the sacrificial layer releasing process. FIGS. 8K, 9K, and 10J illustrate partial cross-sections of completed and "released" interferometric modulator structures. It will be understood that multiple pixels are arranged in arrays organized by row and column, and that the device includes peripheral routing outside the array to connect with row and column drivers.

A mechanical layer patterned using a hard mask can have a line edge roughness smaller than that of a mechanical layer formed without using a hard mask. A mechanical layer (with a thickness of about 1,000 Å to about 5,000 Å) formed without using a hard mask typically have a maximum line edge roughness of less than about 4 μm. On the other hand, a mechanical layer (with a thickness of about 1,000 Å to about 5,000 Å) patterned using the hard mask of the embodiments described above has a maximum line edge roughness of less than about 0.8 μm.

Figure 11A:
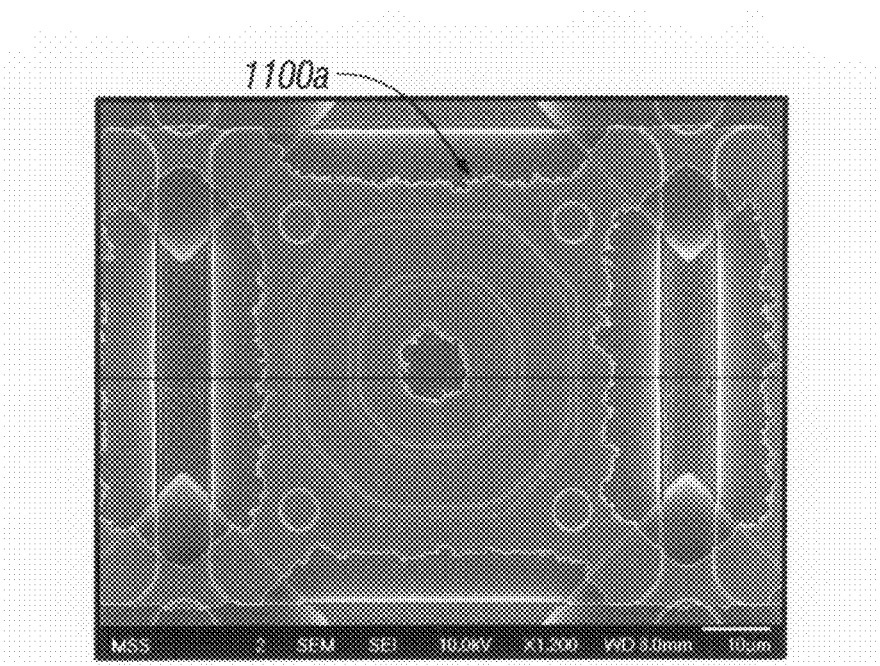
FIG. 11A is a micrograph, taken with a focused ion beam microscope, of a top view of the mechanical layer of an interferometric modulator formed without using a hard mask layer.
Figure 11B:
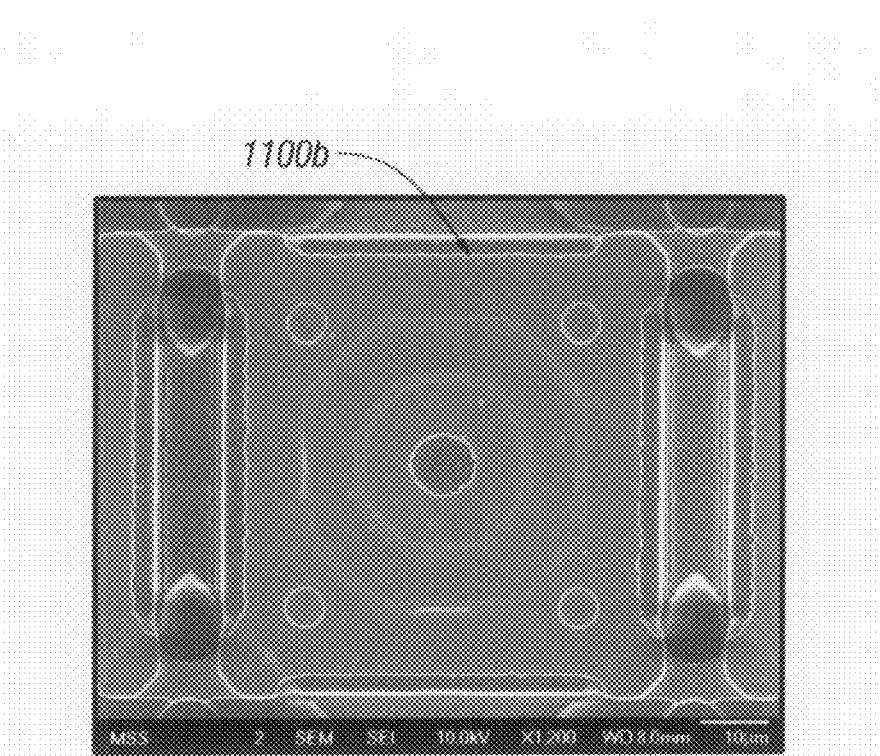
FIG. 11B is a micrograph, taken with a focused ion beam microscope, of a top view of the mechanical layer of an interferometric modulator of similar dimensions and pattern as that of FIG. 11A, but formed using a hard mask layer according to one embodiment.

FIGS. 11A and 11B are micrographs, taken with a focused ion beam microscope, of top views of mechanical layers of interferometric modulators. The mechanical layer 1100a shown in FIG. 11A is one patterned using only a photoresist layer without a hard mask. On the other hand, the mechanical layer 1100b shown in FIG. 11B is one patterned according to the embodiments described above. The mechanical layer 1100b of FIG. 11B has smoother edges than those of the mechanical layer 100a of FIG. 11A.

In addition, a reflective layer (e.g., the reflective layer 84, 94, 104 of FIGS. 8K, 9K, and 10J) underlying the mechanical layer 1100b is substantially free of etch damage because the hard mask is removed using an etchant which is selective for etching the hard mask layer relative to the reflective layer. On the other hand, in a case where an aluminum hard mask is used, etch damage to, for example, a reflective layer can occur when the aluminum hard mask is removed. This may deter use of an aluminum hard mask, thus making it difficult to provide smooth line edges, particularly with the electrode structure shown in FIG. 10J.

The hard mask described above also serves to provide critical dimension (CD) uniformity for mechanical layers. For example, mechanical layers having a thickness of about 1,000 Å to about 5,000 Å, if fabricated without using a hard mask typically have a CD variation of about 1 μm to about 20 μm across an interferometric modulator array. However, mechanical layers having a thickness of about 1,000 Å to about 5,000 Å, if fabricated using a hard mask of the embodiments described above, can have a CD variation of about 0.5 μm to about 1.5 μm across an interferometric modulator array. The CD uniformity may affect the process margin and hence the configuration of an interferometric modulator as the size of the modulator is reduced. In one embodiment, the hard mask may apply to fabrication of an interferometric modulator having an area (when viewed from above or below) of less than about 250 μm×250 μm (or about 62,500 μm$^2$), and particularly an area of about 30 to 250 μm×about 30 to 250 μm (or about 900 μm to about 62,500 μm$^2$).

It should be noted that the hard masks and processes described above can be used for etching other material layers when forming an interferometric modulator or MEMS device. The hard masks may be used to form a structure other than the mechanical layer as long as the etch chemistry permits.

It should also be noted that the embodiments described above are applicable to an interferometric modulator structure viewed from the opposite side, compared to that shown in FIG. 1, which is designed to be viewed through the substrates. In the opposite orientation, the configuration has a reflective electrode closer to the substrate (which need not be transparent) and a semitransparent electrode farther from the substrate. Either or both electrodes could be made movable. In addition, although not shown, it should be noted that the embodiments of FIGS. 8-10 may be combined with options of the embodiments described above with reference to FIGS. 1-7.

The above-described modifications can lead to a more robust design and fabrication. Additionally, while the above aspects have been described in terms of selected embodiments of the interferometric modulator, one of skill in the art will appreciate that many different embodiments of interferometric modulators may benefit from the above aspects. Of course, as will be appreciated by one of skill in the art, additional alternative embodiments of the interferometric modulator can also be employed. The various layers of interferometric modulators can be made from a wide variety of conductive and non-conductive materials that are generally well known in the art of semiconductor and MEMS device fabrication. In addition, the embodiments, although described with respect to an interferometric modulator, are applicable more generally to other MEMS devices.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

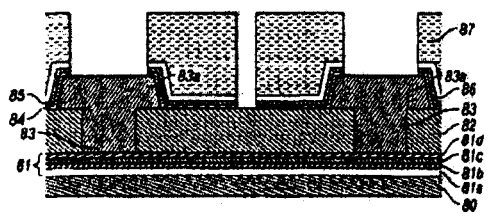

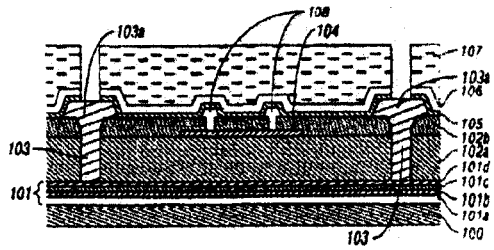

The invention claimed is:

1. A method of making a microelectromechanical system (MEMS) device, the method comprising:
   forming a stationary layer over a substrate;
   forming a sacrificial layer over the stationary layer, the sacrificial layer being formed of a first material;
   forming a mechanical layer over the sacrificial layer; and
   forming a mask layer over the mechanical layer, the mask layer being formed of a second material, wherein the first and second materials are etchable by a single etchant which is substantially selective for etching the first and second materials relative to the mechanical layer.

2. The method of claim 1, wherein the first and second materials are etchable by the etchant at a rate that is at least about 10 times faster than a rate at which the mechanical layer is etchable by the etchant.

3. The method of claim 1, further comprising:
   patterning the mask layer after forming the mask layer; and
   etching the mechanical layer through the patterned mask layer.

4. The method of claim 3, wherein patterning the mask layer comprises, in sequence:
   forming a photoresist layer over the mask layer;
   patterning the photoresist layer; and
   etching the mask layer through the patterned photoresist layer, thereby forming the patterned mask layer.

5. The method of claim 4, wherein etching the mechanical layer comprises etching the mechanical layer with the patterned photoresist layer over the patterned mask layer.

6. The method of claim 4, wherein patterning the mask layer further comprises removing the photoresist layer after etching the mask layer.

7. The method of claim 4, wherein the mask layer adheres to the mechanical layer better than the photoresist layer would adhere to the mechanical layer.

8. The method of claim 3, further comprising:
   simultaneously removing the patterned mask layer and the sacrificial layer after etching the mechanical layer.

9. The method of claim 8, wherein simultaneously removing comprises using a fluorine-based etchant.

10. The method of claim 9, wherein the fluorine-based etchant comprises $XeF_2$.

11. The method of claim 8, wherein simultaneously removing comprises using a dry etch process.

12. The method of claim 8, wherein simultaneously removing comprises using a wet etch process.

13. The method of claim 1, wherein the first material is the same as the second material.

14. The method of claim 1, wherein the first material is different from the second material.

15. The method of claim 1, wherein the first material is selected from the group consisting of molybdenum, silicon, and tungsten.

16. The method of claim 15, wherein the second material is selected from the group consisting of molybdenum, silicon, titanium, tungsten, and silicon-rich silicon nitride.

17. The method of claim 1, wherein the mask layer has a thickness of about 10 Å to about 100 μm.

18. The method of claim 1, wherein the mechanical layer is formed of nickel or a nickel alloy.

19. The method of claim 1, further comprising forming a reflective layer after forming the sacrificial layer and prior to forming the mechanical layer.

20. The method of claim 19, wherein the reflective layer is formed of aluminum or an aluminum alloy.

21. The method of claim 19, wherein the reflective layer is formed of a third material different from the second material, and wherein the third material is substantially not etchable by the single etchant.

22. The method of claim 19, wherein the first and second materials are etchable by the etchant at a rate that is at least about 10 times faster than a rate at which the reflective layer is etchable by the etchant.

23. The method of claim 1, wherein the stationary layer comprises a transparent electrode and a dielectric material overlying the transparent electrode.

24. The method of claim 1, wherein the mask layer comprises a hard mask layer.

25. A microelectromechanical system (MEMS) device made by the method of claim 1.

26. The device of claim 25, wherein the MEMS device comprises an interferometric modulator.

27. The device of claim 25, wherein the MEMS device comprises a mechanical layer having a maximum line edge roughness of less than about 0.8 μm, and an area of less than about 62,500 μm².

28. The device of claim 25, wherein the MEMS device comprises a mechanical layer and a reflective layer, the reflective layer being suspended from the mechanical layer, the reflective layer being substantially free of etch damage.

29. An optical microelectromechanical system (MEMS) device comprising:
   an array of interferometric modulators, each interferometric modulator comprising:
      a stationary layer; and
      a movable mirror overlying the stationary layer with a cavity therebetween, the movable mirror being movable in the cavity between a first position and a second position, the first position being a first distance from the stationary layer, the second position being a second distance from the stationary layer, the second distance being greater than the first distance, the movable mirror comprising a reflective layer and a mechanical layer overlying the reflective layer, the mechanical layer being formed of nickel or a nickel alloy, the mechanical layer having an area of less than about 62,500 μm²,
      wherein the mechanical layer has a maximum line edge roughness of less than about 0.8 μm,
      wherein the reflective layer is suspended from the mechanical layer, and is substantially free of etch damage.

30. The device of claim 29, wherein the reflective layer is formed of aluminum or an aluminum alloy.

31. The device of claim 29, wherein the mechanical layers of the interferometric modulators across the array have a critical dimension variation of about 0.5 μm to about 1.5 μm.

32. The device of claim 29, further comprising a sacrificial layer interposed between the stationary layer and the movable mirror, and a mask layer overlying the movable mirror, the sacrificial layer being formed of a first material, the mask layer being formed of a second material, the reflective layer being formed of a third material,
   wherein the first and second materials are etchable by the same etchant, and
   wherein the third material is substantially not etchable by the etchant.

33. The method of claim 32, wherein the first and second materials are etchable by the etchant at a rate that is at least about 10 times faster than a rate at which the third material is etchable by the etchant.

34. The device of claim 32, wherein the first material is the same as the second material.

35. The device of claim 32, wherein the first material is different from the second material.

36. The device of claim 32, wherein the first material is selected from the group consisting of molybdenum, silicon, and tungsten.

37. The device of claim 36, wherein the second material is selected from the group consisting of molybdenum, silicon, titanium, tungsten, and silicon nitride.

38. The device of claim 29, further comprising:
   a display;
   a processor that is in electrical communication with the display, the processor being configured to process image data; and
   a memory device in electrical communication with the processor.

39. The device of claim 38, further comprising:
   a first controller configured to send at least one signal to the display; and
   a second controller configured to send at least a portion of the image data to the first controller.

40. The device of claim 38, further comprising:
   an image source module configured to send the image data to the processor.

41. The device of claim 38, further comprising:
   an input device configured to receive input data and to communicate the input data to the processor.

42. A microelectromechanical system (MEMS) device, the device comprising:
   first electrode means for conducting a first electrical signal;
   second electrode means for conducting a second electrical signal;
   means for supporting the first and second electrode means;
   means for providing a gap between the first electrode means and the second electrode means; and
   means for patterning the second electrode means with a low edge roughness, the means for patterning being removable without damage to the first and second electrode means.

43. The device of claim 42, wherein the first electrode means comprises an at least partially transparent electrode, wherein the second electrode means comprises a movable electrode, wherein the means for supporting comprises a substantially transparent substrate, and wherein the means for providing the gap comprises a sacrificial layer.

44. The device of claim 43, wherein the means for patterning the second electrode means comprises a mask layer, and wherein the mask layer and the sacrificial layer are etchable by a single etchant which is selective for etching the mask layer and the sacrificial layer relative to the transparent electrode and the movable electrode.

45. The device of claim 43, wherein the movable electrode comprises a mechanical layer and a reflective layer, the reflective layer being suspended from the mechanical layer, the reflective layer being substantially free of etch damage.

* * * * *

UNITED STATES PATENT AND TRADEMARK OFFICE
CERTIFICATE OF CORRECTION

PATENT NO. : 7,625,825 B2 Page 1 of 2
APPLICATION NO. : 11/763234
DATED : December 1, 2009
INVENTOR(S) : Wen-Sheng Chan It is certified that error appears in the above-identified patent and that said Letters Patent is hereby corrected as shown below:

Delete the title page and substitute therefore the attached title page showing the corrected number of claims in issued patent.

On column 11, line 35, delete "81 a" and insert -- 81a -- therefor.

On column 21, line 14, delete "100a" and insert -- 1100a -- therefor.

On column 21, line 41, delete "μm" and insert -- $\mu m^2$ -- therefor.

From column 23, line 28 to column 24, line 65, delete Claims 25-45.

Signed and Sealed this

Eleventh Day of May, 2010

David J. Kappos
*Director of the United States Patent and Trademark Office*

(12) United States Patent
Chan

(10) Patent No.: US 7,625,825 B2
(45) Date of Patent: Dec. 1, 2009

(54) METHOD OF PATTERNING MECHANICAL LAYER FOR MEMS STRUCTURES

(75) Inventor: Wen-Sheng Chan, Jhubei (TW)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 250 days.

(21) Appl. No.: 11/763,234

(22) Filed: Jun. 14, 2007

(65) Prior Publication Data
US 2008/0310008 A1    Dec. 18, 2008

(51) Int. Cl.
*H01L 21/302* (2006.01)
*H01L 21/31* (2006.01)
(52) U.S. Cl. .................................. 438/720; 438/754
(58) Field of Classification Search ......... 438/717–720, 438/753–757
See application file for complete search history.

(56) References Cited

U.S. PATENT DOCUMENTS

| | | | |
|---|---|---|---|
| 3,728,030 | A | 4/1973 | Hawes |
| 3,955,880 | A | 5/1976 | Lierke |
| 4,377,324 | A | 3/1983 | Durand et al. |
| 4,482,213 | A | 11/1984 | Piliavin et al. |
| 4,519,676 | A | 5/1985 | te Velde |
| 4,786,128 | A | 11/1988 | Birnbach |
| 4,790,635 | A | 12/1988 | Apsley |
| 4,900,136 | A | 2/1990 | Goldburt et al. |
| 4,965,562 | A | 10/1990 | Verhulst |
| 5,022,745 | A | 6/1991 | Zahowski et al. |
| 5,044,736 | A | 9/1991 | Jaskie et al. |
| 5,075,796 | A | 12/1991 | Schildkraut et al. |
| 5,099,353 | A | 3/1992 | Hornbeck |
| 5,124,834 | A | 6/1992 | Cusano et al. |
| 5,168,406 | A | 12/1992 | Nelson |

(Continued)

FOREIGN PATENT DOCUMENTS

CH    680534    9/1992

(Continued)

OTHER PUBLICATIONS

Chiou et al., "A Novel Capacitance Control Design of Tunable Capacitor Using Multiple Electrostatic Driving Electrodes," IEEE Nano 2001, M3.1, Nanoelectronics and Giga-Scale Systems (Special Session), Oct. 29, 2001, pp. 319-324.

(Continued)

*Primary Examiner*—Calvin Lee
(74) *Attorney, Agent, or Firm*—Knobbe, Martens, Olson & Bear LLP

(57) ABSTRACT

A method of making a microelectromechanical system (MEMS) device is disclosed. The method includes forming a stationary layer over a substrate. A sacrificial layer is formed over the stationary layer. The sacrificial layer is formed of a first material. A mechanical layer is formed over the sacrificial layer. A hard mask layer is formed over the mechanical layer. The hard mask layer is formed of a second material. The first and second materials are etchable by a single etchant which is substantially selective for etching the first and second materials relative to the mechanical layer. The hard mask layer is patterned after forming the hard mask layer. Subsequently, the mechanical layer is etched through the patterned hard mask layer. The patterned hard mask layer is removed simultaneously with the sacrificial layer after etching the mechanical layer.

24 Claims, 20 Drawing Sheets